(12) United States Patent
Ohta et al.

(10) Patent No.: US 10,729,285 B2
(45) Date of Patent: Aug. 4, 2020

(54) STIRRING BODY AND HEATING/STIRRING COOKER

(71) Applicant: Panasonic Intellectual Property Management Co., Ltd., Osaka (JP)

(72) Inventors: Katsuyuki Ohta, Shinga (JP); Makoto Nishimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 327 days.

(21) Appl. No.: 15/763,862

(22) PCT Filed: Oct. 5, 2016

(86) PCT No.: PCT/JP2016/004485
§ 371 (c)(1),
(2) Date: Mar. 28, 2018

(87) PCT Pub. No.: WO2017/064849
PCT Pub. Date: Apr. 20, 2017

(65) Prior Publication Data
US 2018/0279832 A1 Oct. 4, 2018

(30) Foreign Application Priority Data

Oct. 14, 2015 (JP) .................. 2015-202876
Oct. 14, 2015 (JP) .................. 2015-202877
(Continued)

(51) Int. Cl.
*A47J 43/046* (2006.01)
*A47J 44/02* (2006.01)
(Continued)

(52) U.S. Cl.
CPC ......... *A47J 43/0465* (2013.01); *A47J 27/004* (2013.01); *A47J 43/085* (2013.01); *A47J 44/02* (2013.01); *F16D 27/01* (2013.01)

(58) Field of Classification Search
CPC .. A47J 43/046; A47J 43/0761; A47J 43/0772; A47J 43/07; A47J 43/0716;
(Continued)

(56) References Cited

U.S. PATENT DOCUMENTS 7,314,307 B2  1/2008  Cai
2013/0001220 A1  1/2013  Vidal et al.

FOREIGN PATENT DOCUMENTS

JP  8-035664  2/1996
JP  2011-156200  8/2011
JP  2011156200 A * 8/2011

OTHER PUBLICATIONS

International Search Report of PCT application No. PCT/JP2016/004485 dated Dec. 13, 2016.

* cited by examiner

*Primary Examiner* — Sarang Afzali
*Assistant Examiner* — Ruth G Hidalgo-Hernandez
(74) *Attorney, Agent, or Firm* — Wenderoth, Lind & Ponack, L.L.P.

(57) ABSTRACT

A heating/stirring cooker includes a stirring body. The stirring body is detachably attached to the interior of a container, and stirs the food. The stirring body includes a blade, a permanent magnet, a magnetic metal plate, a storage, and a clutch. The blade stirs the food. When the stirring body is attached to the container, the permanent magnet is located opposite the inner bottom surface of the container and receives a rotating magnetic field. The magnetic metal plate is provided on the permanent magnet and inhibits magnetic flux leakage. The storage has a perimeter (Continued)

on which the blade is formed, and movably stores the permanent magnet. The clutch transmits the rotational force of the rotating magnetic field to the storage, only when a claw is in engagement with a notch. The stirring body generates high rotational force when attached and suppresses the impact of the magnetic field when detached.

14 Claims, 21 Drawing Sheets

(30)           Foreign Application Priority Data

May 26, 2016    (JP) ................................ 2016-104743
May 26, 2016    (JP) ................................ 2016-104744

(51) Int. Cl.
    *F16D 27/01*         (2006.01)
    *A47J 27/00*         (2006.01)
    *A47J 43/08*         (2006.01)

(58) Field of Classification Search
    CPC .. A47J 43/0766; A47J 43/0722; A47J 43/085;
               A47J 43/042; A47J 43/0465; F16D 27/01;
                    F04D 29/181; F04D 13/021; F04D
                       13/024; F04D 416/19; F04D 416/169
    See application file for complete search history.

STIRRING BODY AND HEATING/STIRRING COOKER

This application is a U.S. national stage application of the PCT International Application No. PCT/JP2016/004485 filed on Oct. 5, 2016, which claims the benefit of foreign priority of Japanese patent application No. 2016-104743 filed on May 26, 2016, Japanese patent application No. 2016-104744 filed on May 26, 2016, Japanese patent application No. 2015-202876 filed on Oct. 14, 2015, and Japanese patent application No. 2015-202877 filed on Oct. 14, 2015, the contents all of which are incorporated herein by reference.

TECHNICAL FIELD

The present disclosure relates to a heating/stirring cooker which stirs food while heating.

DESCRIPTION OF THE RELATED ART

The prior art related to the present disclosure includes a heating cooker which not only provides induction heating, but also, in order to prevent burning of food, stirs the food by rotating a rotary vane in a pot by the effect of a magnetic field generated from a coil for induction heating (for example, refer to Patent Literature (PTL) 1). This heating cooker can be used as a blender, a food processor, and the like.

FIG. 24 is a block diagram of the above-mentioned conventional heating cooker. As shown in FIG. 24, this heating cooker includes main body 101 and pot 105.

Main body 101 includes inverter 103 and coil 104. Pot 105 is made of a non-magnetic metal. Rotary vane 107 includes permanent magnet 106 and is provided on the inner bottom surface of pot 105. Coil 104 generates a magnetic field according to a high-frequency electric current output from inverter 103. By the effect of this magnetic field, the conventional heating cooker heats pot 105 by induction and rotatably drives rotary vane 107.

CITATION LIST

Patent Literature

PTL 1: Unexamined Japanese Patent Publication No. H08-035664

SUMMARY

With the configuration in which motive power is transmitted by the effect of the magnetic field as described above, magnetic coupling is reduced as the gap between the permanent magnet and the coil increases. In the above-mentioned conventional technique, pot 105 and a top panel of main body 101 form a gap of 5 to 15 mm between permanent magnet 106 and coil 104.

In order to generate sufficient rotational force to stir the food in pot 105, it is necessary to provide a configuration that causes magnetic flux generated by coil 104 and magnetic flux from permanent magnet 106 to be sufficiently interlinked.

A blade provided on rotary vane 107 to stir the food limits the inner space in which a magnetic body is provided. Thus, in order to increase magnetic flux density in the limited space, it is necessary to use a powerful permanent magnet such as a sintered neodymium magnet.

However, because of powerful magnetic force, rotary vane 107 needs to be carefully handled when detached from pot 105. Specifically, in the case of washing rotary vane 107, for example, attention is required to avoid adherence of rotary vane 107 to a knife, a fork, a kitchen sink, and so on that are made of magnetic metals.

Rotary vane 107 having powerful magnetic force as just described has other problems such as impact on a watch, a magnetic card, and so on, which need to be solved as a consumer product.

In order to solve the above-mentioned problems, a stirring body according to an aspect of the present disclosure is detachably attached to the interior of a container in which food is placed, and is configured to stir the food in the container. The stirring body according to the present aspect includes a blade, a permanent magnet, a magnetic metal plate, a storage, and a clutch.

The blade is configured to stir the food. The permanent magnet is located opposite the inner bottom surface of the container and configured to receive a rotating magnetic field when the stirring body is attached to the container.

The magnetic metal plate is provided on the permanent magnet and configured to inhibit magnetic flux leakage. The storage has a perimeter on which the blade is formed, and movably stores the permanent magnet. The clutch is configured to hold either the state where the rotational force of the rotating magnetic field is transmitted to the storage or the state where the rotational force of the rotating magnetic field is not transmitted to the storage.

Another aspect of the present disclosure is a heating/stirring cooker including the stirring body according to the above-mentioned aspect in which the permanent magnet is a permanent magnet to be driven. The heating/stirring cooker according to the present aspect further includes: a container in which food is placed; a rotating magnetic field generation unit which generates a rotating magnetic field; a container housing which includes the rotating magnetic field generation unit and houses the container; and a heater provided in the container housing and configured to heat the container.

According to the present aspect, it is possible to provide a stirring body which when attached, can generate high rotational force and when detached, can suppress the impact of a magnetic field, and a heating/stirring cooker including the stirring body.

DETAILED DESCRIPTION

Figure 1:
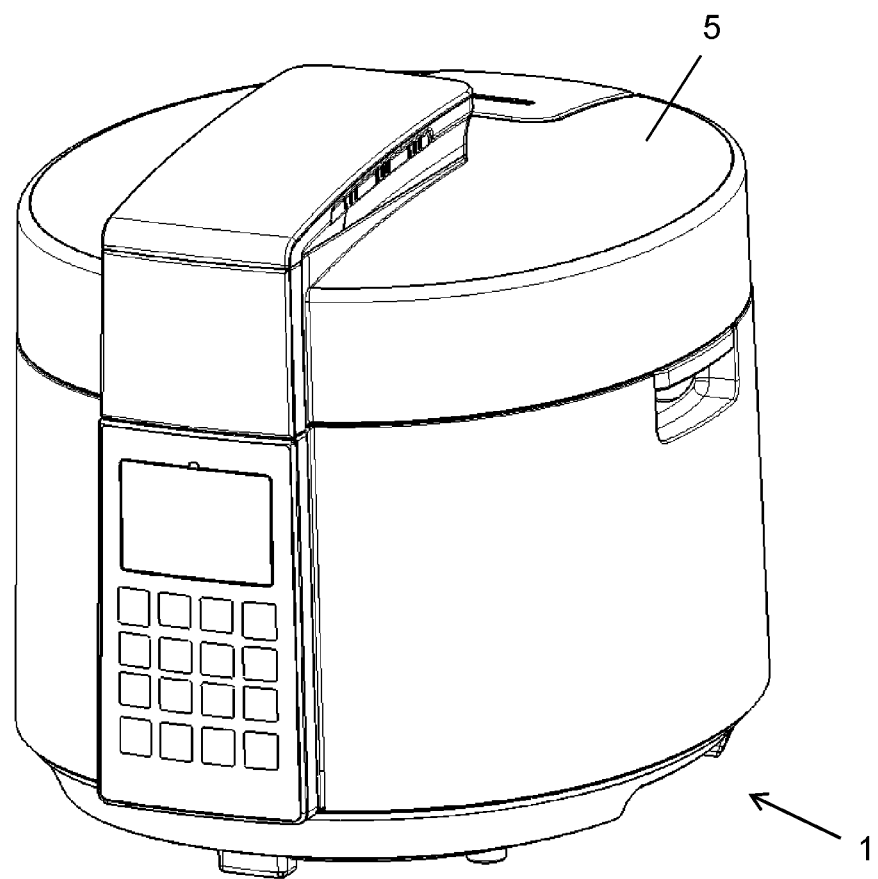
FIG. 1 is a perspective view of the external appearance of a heating/stirring cooker according to Embodiment 1.

A stirring body according to the first aspect of the present disclosure is detachably attached to the interior of a container in which food is placed, and is configured to stir the food in the container. The stirring body according to the present aspect includes a blade, a permanent magnet, a magnetic metal plate, a storage, and a clutch.

The blade is configured to stir the food. The permanent magnet is located opposite the inner bottom surface of the container and configured to receive a rotating magnetic field when the stirring body is attached to the container.

The magnetic metal plate is provided on the permanent magnet and configured to inhibit magnetic flux leakage. The storage has a perimeter on which the blade is formed, and movably stores the permanent magnet. The clutch is configured to hold either the state where the rotational force of the rotating magnetic field is transmitted to the storage or the state where the rotational force of the rotating magnetic field is not transmitted to the storage.

The stirring body according to the present aspect can generate high rotational force when attached and can suppress the impact of the magnetic field when detached.

According to the second aspect of the present disclosure, in the first aspect, the clutch includes: a claw provided integrally with the permanent magnet; and a notch which is provided on the storage and engageable with the claw. The clutch is configured to transmit the rotational force of the rotating magnetic field to the storage when the claw is in engagement with the notch. The clutch is configured not to transmit the rotational force of the rotating magnetic field to the storage when the claw is not in engagement with the notch.

The stirring body according to the present aspect can generate high rotational force when attached and can suppress the impact of the magnetic field on a surrounding area when detached.

According to the third aspect of the present disclosure, in the second aspect, the clutch has a sliding surface continuously formed from the notch, and the claw is configured to rotate along the sliding surface to inhibit the rotational force of the rotating magnetic field from being transmitted to the storage.

According to the present aspect, when the rotation of the stirring body is hindered, the permanent magnet continues to rotate idly in the storage so that the clutch is placed in the state where the rotational force of the rotating magnetic field is not transmitted to the storage. As a result, the stirring body is not detached from the container; thus, the stirring function will not be lost.

According to the fourth aspect of the present disclosure, in any one of the first to third aspects, the storage includes a coil spring which presses against the permanent magnet in a direction opposite to a direction in which the rotating magnetic field attracts the permanent magnet.

According to the present aspect, the coil spring and the clutch can vertically move the permanent magnet inside the storage. Thus, adherence of eating utensils made of magnetic metals, such as a fork and a knife, to the stirring body can be prevented.

According to the fifth aspect of the present disclosure, in any one of the first to fourth aspects, a magnetic metal member is provided on an inner side wall of the storage that faces a side surface of the permanent magnet in the state where the clutch does not transmit the rotational force of the rotating magnetic field to the storage.

According to the present aspect, adherence of a magnetic metal object to the stirring body can be prevented when the stirring body is handled outside the container for the purposes of washing, storage, and so on.

The sixth aspect of the present disclosure is a heating/stirring cooker including the stirring body according to the first aspect in which the permanent magnet is a permanent magnet to be driven. The heating/stirring cooker according to the present aspect further includes: a container in which food is placed; a rotating magnetic field generation unit which includes a driving permanent magnet and generates a rotating magnetic field; a container housing which includes the rotating magnetic field generation unit and houses the container; and a heater provided in the container housing and configured to heat the container.

The heating/stirring cooker according to the present aspect can generate high rotational force when the stirring body is attached thereto, and can suppress the impact of a magnetic field when the stirring body is detached.

According to the seventh aspect of the present disclosure, in the sixth aspect, the driving permanent magnet has more powerful magnetic force than the permanent magnet to be driven.

With the heating/stirring cooker according to the present aspect, it is possible to generate high rotational force when the stirring body is attached, and the stirring body is easy to handle upon attachment and detachment.

According to the eighth aspect of the present disclosure, in the seventh aspect, the driving permanent magnet includes a sintered neodymium magnet, and the permanent magnet to be driven includes at least one of a samarium-cobalt magnet, an Fe—Cr—Co magnet, an Fe—Nd—B bond magnet, and a ferrite magnet.

With the heating/stirring cooker according to the present aspect, it is possible to generate high rotational force when the stirring body is attached, and the stirring body is easy to handle upon attachment and detachment.

According to the ninth aspect of the present disclosure, in the sixth aspect, the driving permanent magnet has an outside diameter greater than an outside diameter of the permanent magnet to be driven. The heating/stirring cooker according to the present aspect can maintain the stirring function even if displacement from a predetermined position occurs.

The heating/stirring cooker according to the tenth aspect of the present disclosure includes, in the sixth aspect: a separator provided covering the rotating magnetic field generation unit; and a biasing device which biases the separator away from the rotating magnetic field generation unit. The separator is configured to, when the container is housed in the container housing, be pushed by the container and approach the rotating magnetic field generation unit, and when the container is detached from the container housing, return to the original state by a biasing force of the biasing device.

According to the present aspect, when the container is housed in the container housing, the rotating magnetic field can more effectively act on the stirring body. When the container is taken out of the container housing, adherence of a magnetic metal object to the inner bottom surface of the container housing is prevented.

According to the eleventh aspect of the present disclosure, in the tenth aspect, the separator includes a non-magnetic metal material. According to the present aspect, the rotating magnetic field from the rotating magnetic field generation unit can act on the stirring body through the separator.

According to the twelfth aspect of the present disclosure, in the sixth aspect, the separator includes a temperature sensor which detects a temperature of the container. When the container contacts the separator, the temperature sensor according to the present aspect can accurately detect the temperature of the container.

According to the thirteenth aspect of the present disclosure, in the sixth aspect, the driving permanent magnet is configured to, by the effect of a magnetic field from the permanent magnet to be driven, approach the stirring body when the stirring body is attached to the container, and be separated from the stirring body when the stirring body is detached from the container.

According to the present aspect, when the stirring body is attached to the container, the magnetic field from the driving permanent magnet effectively acts on the stirring body. When the stirring body is not attached to the container, adherence of a magnetic metal object to the inner bottom surface of the container is prevented.

According to the fourteenth aspect of the present disclosure, in the thirteenth aspect, the rotating magnetic field generation unit includes: a coupling portion which movably stores the driving permanent magnet; and a drive motor coupled to the coupling portion, and the driving permanent magnet is configured to fit into the coupling portion when the driving permanent magnet approaches the stirring body.

According to the present aspect, when the driving permanent magnet approaches the stirring body, the drive motor can rotate the driving permanent magnet via the coupling portion.

Hereinafter, embodiments of the present disclosure will be described with reference to the drawings. In the subsequent description, the same reference marks are given to the same or corresponding parts and redundant description thereof will be omitted.

Embodiment 1

Figure 2:
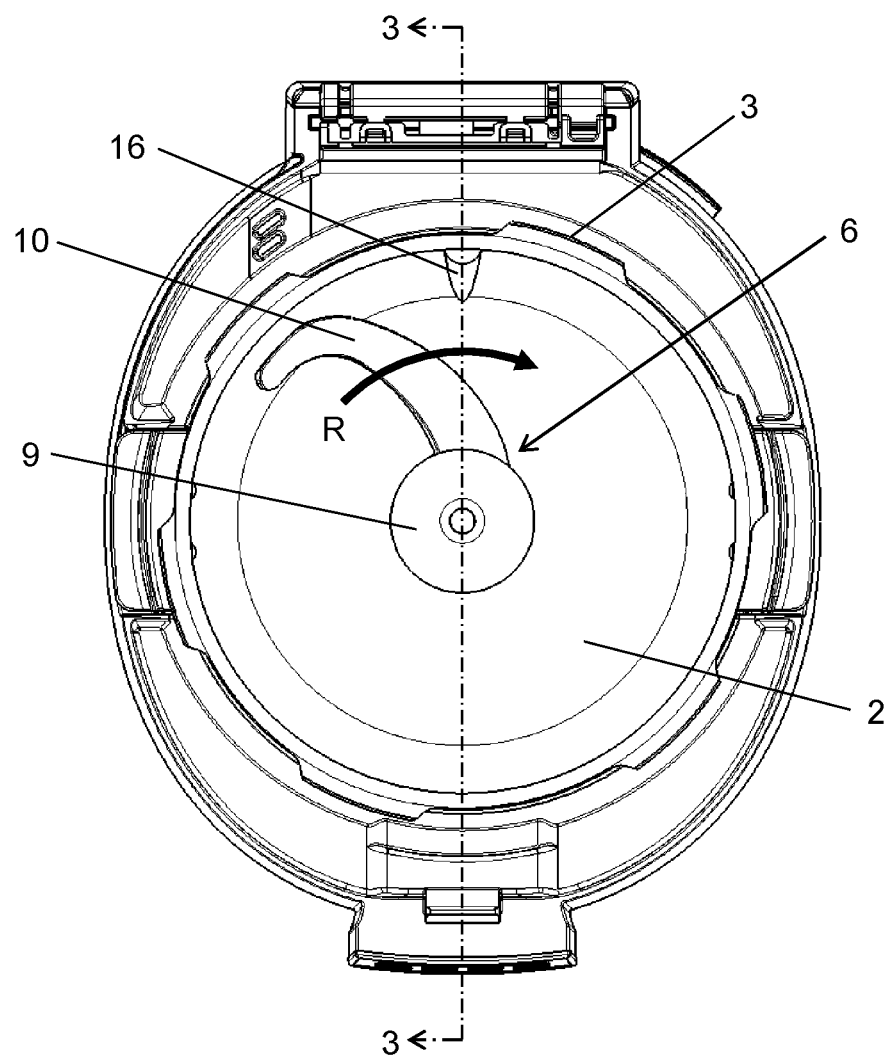
FIG. 2 is a top view of a heating/stirring cooker according to Embodiment 1 with the lid removed.
Figure 3:
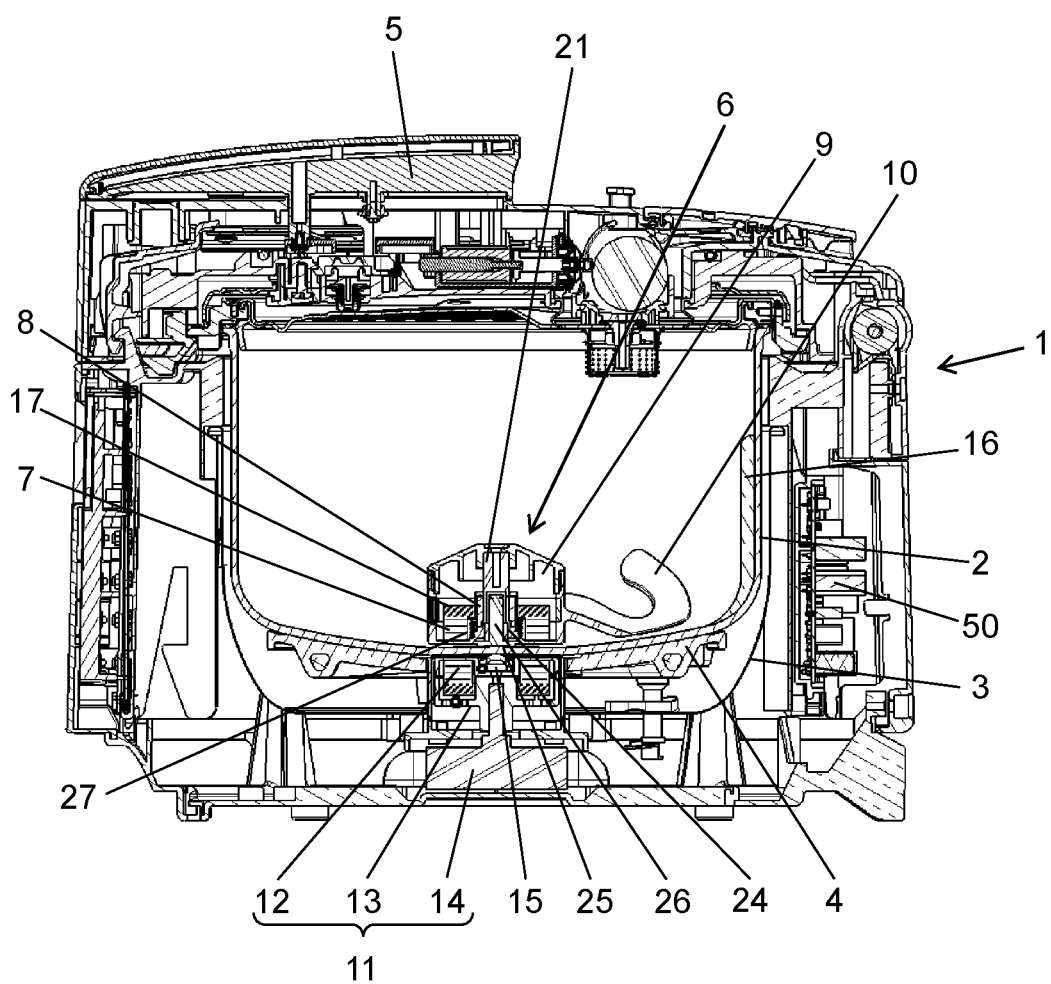
FIG. 3 is a cross-sectional view taken along line 3-3 in FIG. 2.
Figure 4:
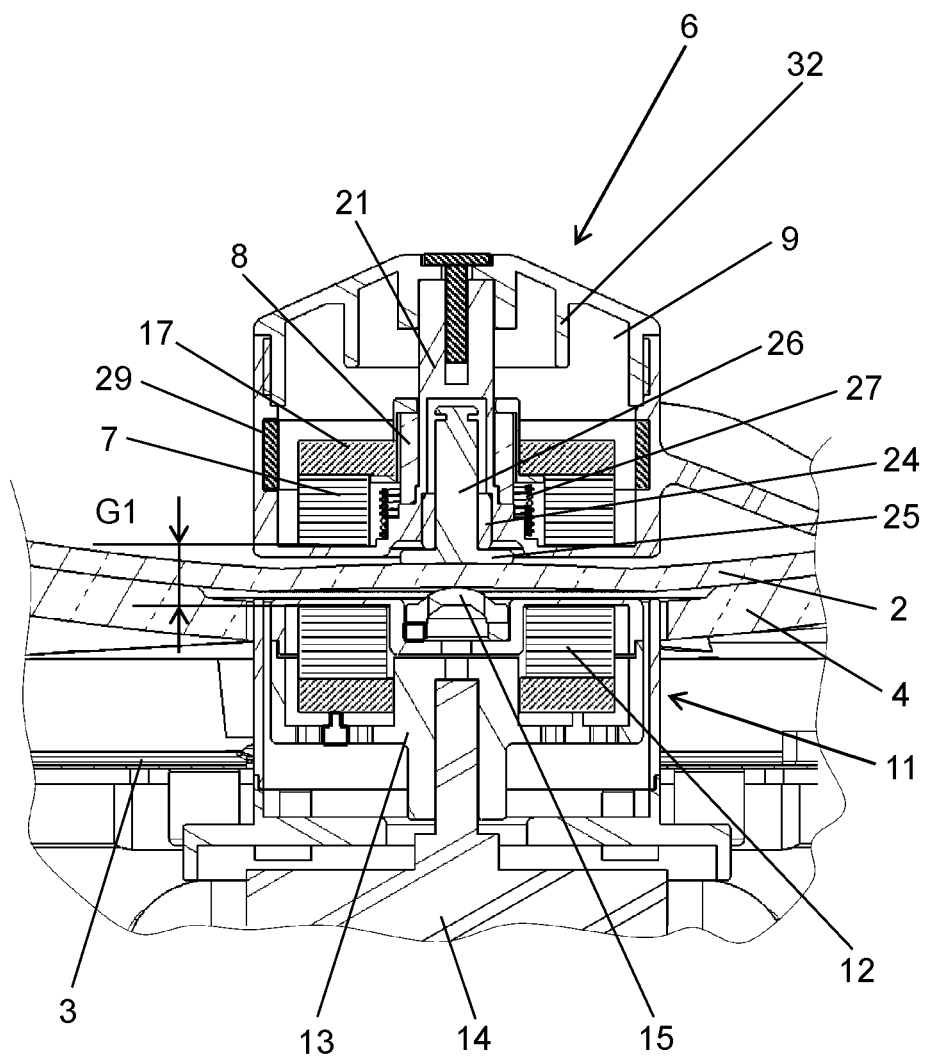
FIG. 4 is an enlarged cross-sectional view of a relevant portion in FIG. 3.
Figure 5:
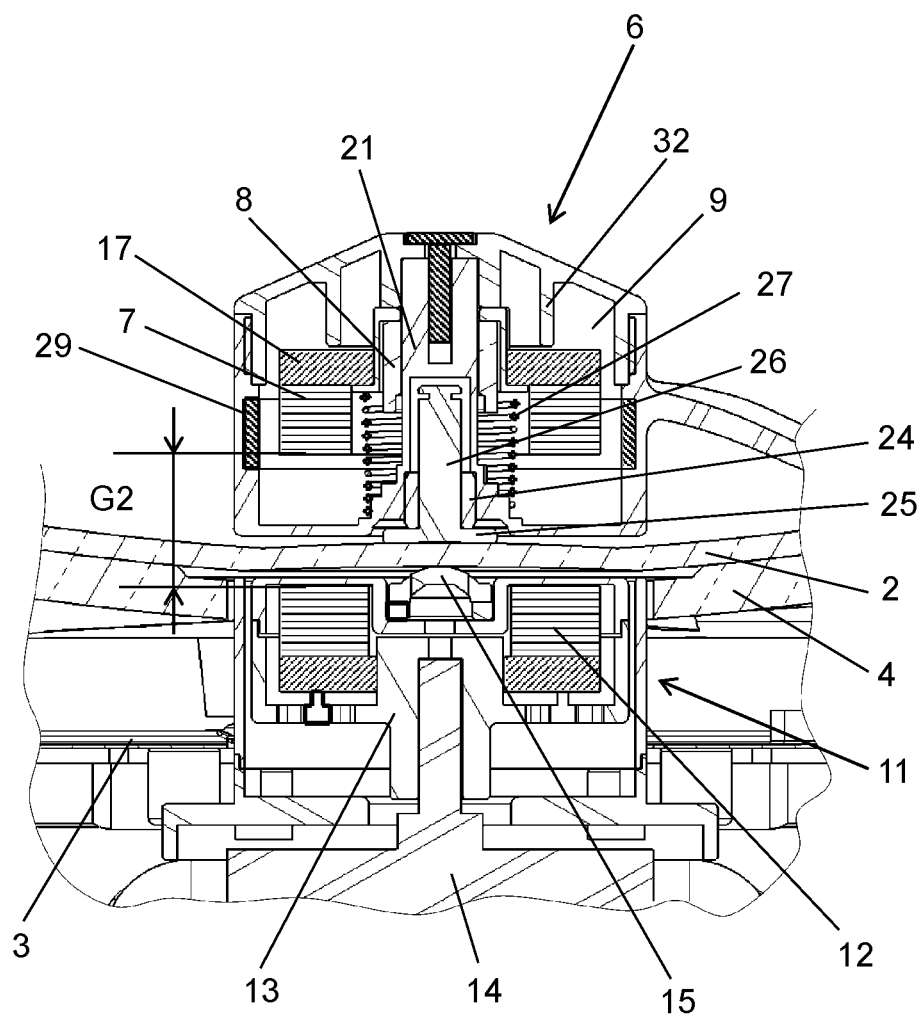
FIG. 5 is an enlarged cross-sectional view of a relevant portion for illustrating an operation of a heating/stirring cooker according to Embodiment 1.

FIG. 1 is a perspective view of the external appearance of a heating/stirring cooker according to Embodiment 1 of the present disclosure. FIG. 2 is a top view of the heating/stirring cooker according to the present embodiment with the lid removed. FIG. 3 is a cross-sectional view taken along line 3-3 in FIG. 2. FIG. 4 is an enlarged cross-sectional view of a relevant portion in FIG. 3. FIG. 5 is an enlarged cross-sectional view of a relevant portion for illustrating an operation of the heating/stirring cooker according to the present embodiment.

Figure 6A:
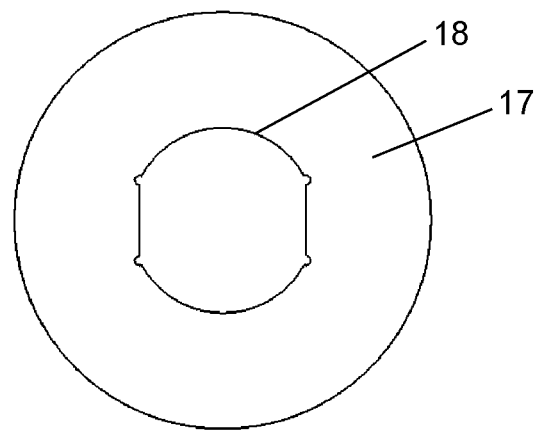
FIG. 6A is a top view of a relevant portion of a stirring body according to Embodiment 1.
Figure 6B:
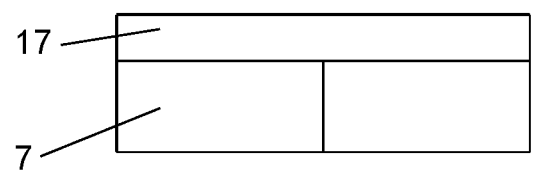
FIG. 6B is a side view of a relevant portion of a stirring body according to Embodiment 1.
Figure 6C:
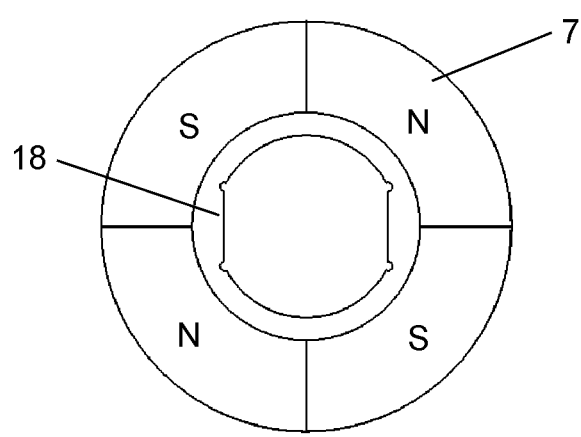
FIG. 6C is a back view of a relevant portion of a stirring body according to Embodiment 1.
Figure 7A:
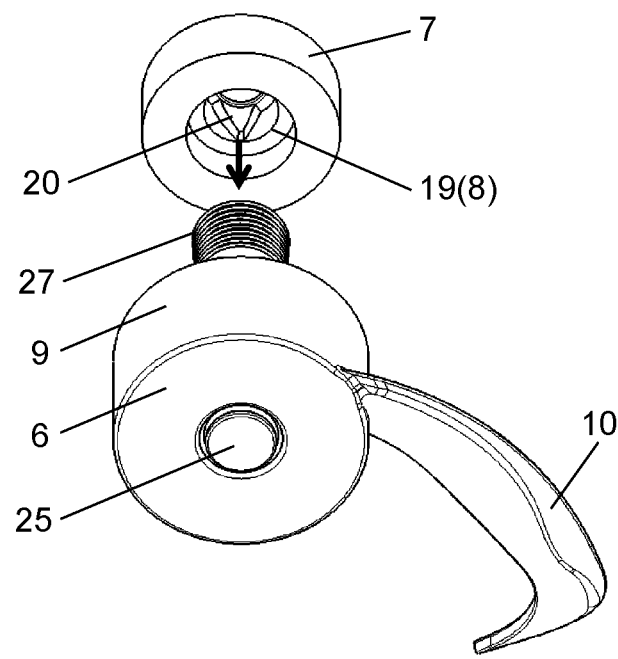
FIG. 7A is an exploded perspective view of a stirring body according to Embodiment 1, as seen from the lower surface side.
Figure 7B:
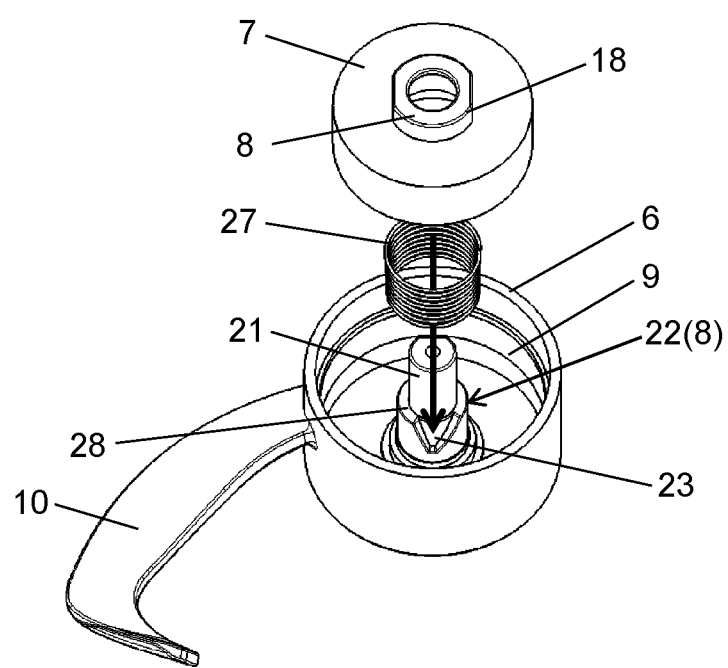
FIG. 7B is an exploded perspective view of a stirring body according to Embodiment 1, as seen from the upper surface side.

FIG. 6A, FIG. 6B, and FIG. 6C are a top view, a side view, and a back view, respectively, of a relevant portion of a stirring body according to the present embodiment. FIG. 7A is an exploded perspective view of the stirring body according to the present embodiment, as seen from the lower surface side. FIG. 7B is an exploded perspective view of the stirring body according to the present embodiment, as seen from the upper surface side. FIGS. 8 to 11 are cross-sectional views for illustrating operations of the stirring body according to the present embodiment.

As shown in FIGS. 1 to 3, the main body of heating/stirring cooker 1 includes container housing 3 which houses container 2 in which food (not shown in the drawings) is placed. In order to heat container 2, annular heater 4 is provided on the bottom of container housing 3 in such a way as to contact the bottom surface of container 2. Lid 5 is provided in such a way as to openably cover an upper opening of the main body of heating/stirring cooker 1 and an upper opening of container 2.

Stirring body 6 includes: storage 9 which stores permanent magnet 7 and clutch 8; and blade 10 provided outside storage 9. Stirring body 6 is detachably attached to the inner bottom surface of container 2. When stirring body 6 rotates, the food in container 2 is stirred by blade 10.

In the subsequent description, upper/upward/above and lower/downward/below respectively mean upper/upward/above and lower/downward/below in the state where stirring body 6 is attached to container 2.

When stirring body 6 is provided on the inner bottom surface of container 2, permanent magnet 7 receives a rotating magnetic field from below container 2. This rotating magnetic field is generated by rotating magnetic field generation unit 11.

Rotating magnetic field generation unit 11 is disposed outside the bottom surface of container 2, in a position opposite to permanent magnet 7 across the bottom surface of container 2. Rotating magnetic field generation unit 11 includes: coupling portion 13 which stores permanent magnet 12 provided on the side of the main body of heating/stirring cooker 1; and drive motor 14 coupled to coupling portion 13. Controller 50 is provided in the main body of heating/stirring cooker 1, and controls drive motor 14.

Coupling portion 13 faces the outer bottom surface of container 2 through a central opening of heater 4 with a clearance of approximately 1 mm. In order to reduce the sliding resistance with container 2, spacer 15, which is sandwiched between coupling portion 13 and the outer bottom surface of container 2, is provided above coupling portion 13.

Spacer 15 has a hemispherical shape so as to make point contact with the outer bottom surface of container 2. Spacer 15 is provided so as to reduce the sliding resistance between the outer bottom surface of container 2 and rotating magnetic field generation unit 11 during rotation of rotating magnetic field generation unit 11.

Obstacle 16 (refer to FIGS. 2 and 3) for improving the stirring performance is provided on the inner side surface of container 2. Obstacle 16 is a vertically extending rib having a height of approximately 6 mm and a semicircular cross-section.

As shown in FIGS. 4 and 5, permanent magnet 7 and clutch 8 are stored in storage 9. As shown in FIGS. 6A to 6C, permanent magnet 7 is in the shape of a flat, circular column.

Permanent magnet 7 has opening 18 which is provided at the center of permanent magnet 7 and includes at least one straight portion when viewed vertically. Permanent magnet 7 includes two north poles and two south poles alternately arranged circumferentially.

As with permanent magnet 7, permanent magnet 12 also includes two north poles and two south poles alternately arranged circumferentially.

Permanent magnet 12 fits into the coupling portion 13; therefore, when drive motor 14 drives coupling portion 13 to rotate, permanent magnet 12 also rotates together with coupling portion 13. Thus, a rotating magnetic field is formed.

In order to inhibit magnetic flux leakage, magnetic metal plate 17 is bonded to the upper surface of permanent magnet 7 in the state where stirring body 6 is attached to container 2. When stirring body 6 is attached to container 2, the lower surface of permanent magnet 7 can receive the rotating magnetic field.

As shown in FIG. 7A, clutch 8 includes a cylindrical clutch projection 19 having claw 20 on the inner circumferential surface. Clutch projection 19 includes trapezoidal claw 20 which protrudes inward and decreases in thickness downward. When clutch projection 19 fits into opening 18 of permanent magnet 7, clutch projection 19 is integrated with permanent magnet 7.

As shown in FIG. 7B, column 21 in the shape of a circular column is provided at the center of the inner bottom surface of storage 9. Clutch 8 further includes cylindrical clutch recess 22 provided in a side surface of column 21. Clutch recess 22 includes notch 23 configured to engage with claw 20. Notch 23 is a trapezoidal indentation that is provided at the upper end of clutch recess 22 and decreases in thickness downward.

After coil spring 27 is provided around column 21, column 21 penetrates permanent magnet 7 and clutch projection 19, and thus permanent magnet 7 and clutch projection 19 are stored in storage 9. In this state, upper position fixing member 32 is attached to the tip of column 21 (refer to FIGS. 4 and 5). As a result, permanent magnet 7 and clutch projection 19 are vertically movable in storage 9 in an integrated form and are rotatable around column 21.

A recess extending from the outer bottom surface of storage 9 to the inside of column 21 is provided at the center of the outer bottom surface of storage 9 in order to insert shaft 26 thereinto. Bush 24 for a bearing and disc-shaped receiving portion 25 are provided on shaft 26 (refer to FIGS. 4 and 5).

When stirring body 6 is attached to container 2, only receiving portion 25 of shaft 26 contacts the bottom surface of container 2, and thus stirring body 6 is rotatable around shaft 26.

As shown in FIGS. 7A to 11, coil spring 27 is provided around column 21 so that pressure is applied to clutch projection 19 between clutch projection 19 and the bottom surface of storage 9. In the state where stirring body 6 is attached to container 2, coil spring 27 upwardly presses against permanent magnet 7 in storage 9. In other words, coil spring 27 presses against permanent magnet 7 in a direction opposite to a direction in which the rotating magnetic field attracts permanent magnet 7.

When stirring body 6 is placed on a metal surface, for example, an iron plate, in the state where clutch projection 19 is closest to upper position fixing member 32 (refer to FIGS. 5 and 10), coil spring 27 applies, to permanent magnet 7, 1.2 to 1.5 times greater pressure than the force of permanent magnet 7 pressing the bottom surface of storage 9 against the metal surface.

Figure 10:
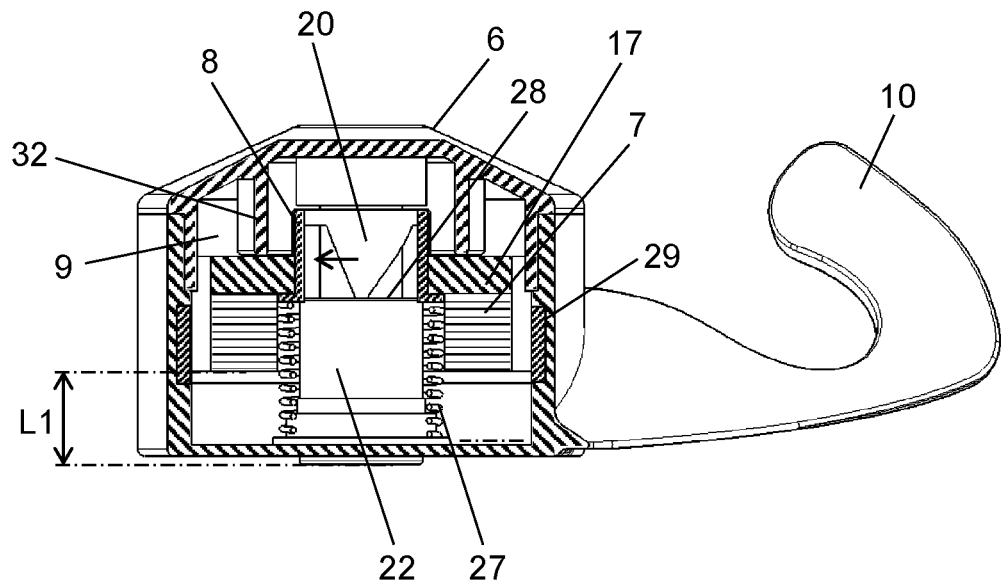
FIG. 10 is a cross-sectional view for illustrating an operation of a stirring body according to Embodiment 1.

Clutch recess 22 has, at an end other than notch 23, sliding surface 28 continuously formed from notch 23. As shown in FIG. 10, when permanent magnet 7 is closest to upper position fixing member 32, claw 20 of clutch projection 19 is rotatable along sliding surface 28.

As shown in FIG. 5, annular magnetic metal member 29 having a thickness of 1 to 3 mm is provided on the inner side wall of storage 9. Magnetic metal member 29 is attached to the inner side wall that faces the side surface of permanent magnet 7 in the state where permanent magnet 7 is closest to upper position fixing member 32.

A clearance of 0.5 to 3 mm is provided between magnetic metal member 29 and permanent magnet 7 in order to prevent permanent magnet 7 from contacting magnetic metal member 29 when permanent magnet 7 vertically moves and rotates inside storage 9.

As shown in FIG. 5, magnetic metal member 29 is provided on the inner side wall of storage 9 so that the side surface of permanent magnet 7 faces magnetic metal member 29 when permanent magnet 7 is closest to upper position fixing member 32. As shown in FIG. 4, when permanent magnet 7 is farthest from upper position fixing member 32, the side surface of permanent magnet 7 does not face magnetic metal member 29.

Figure 9:
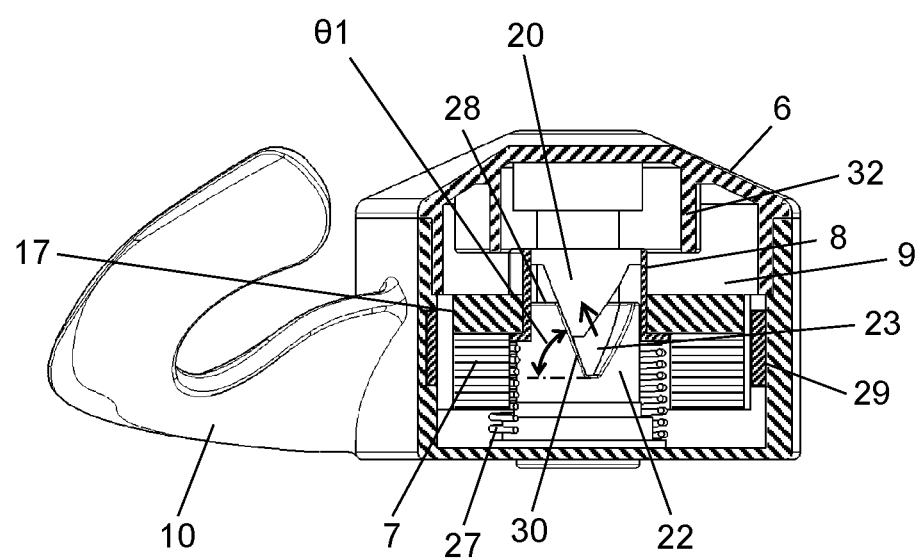
FIG. 9 is a cross-sectional view for illustrating an operation of a stirring body according to Embodiment 1.
Figure 11:
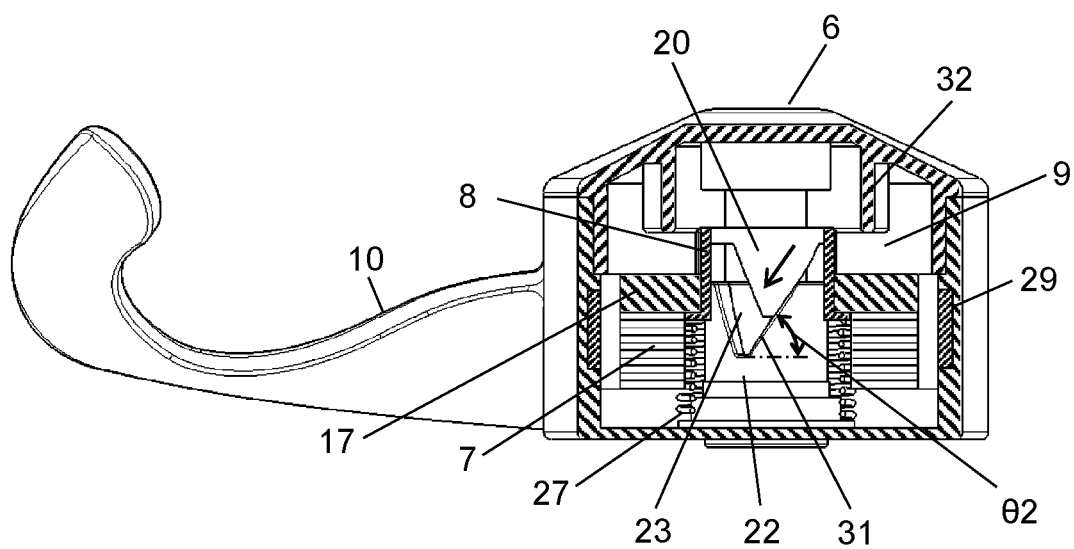
FIG. 11 is a cross-sectional view for illustrating an operation of a stirring body according to Embodiment 1.

As shown in FIGS. 9 and 11, claw 20 is in contact with two inclined surfaces (inclined surfaces 30 and 31) of notch 23. Inclined surface 30 has inclination angle θ1 of 65 to 85 degrees with respect to a plane at right angle with the central axis of shaft 26. Inclined surface 30 receives rotational force transferred from claw 20 when stirring body 6 rotates right as viewed from above (refer to arrow R in FIG. 2). Inclined surface 31 has inclination angle θ2 of 45 to 75 degrees with respect to the plane at right angle with the central axis of shaft 26.

Permanent magnet 12 is made of a sintered neodymium magnet which has the most powerful magnetic force among general magnets. Permanent magnet 7 is made of any one of a sintered neodymium magnet, a samarium-cobalt magnet, an Fe—Cr—Co magnet, and an Fe—Nd—B bond magnet. With the aim of making it easy to handle stirring body 6 when detached from container 2, the material and size of permanent magnet 7 are such that magnetic characteristics, such as magnetic attractive force, lower than those of permanent magnet 12 are exhibited.

Here, the functions of stirring body 6 will be described.

When food is pushed toward the side wall of container 2 by rotation of blade 10 of stirring body 6, the food receives resistance from the inner surface of container 2, particularly, obstacle 16. This resistance causes the food to turn over while climbing over blade 10.

In this way, it is possible to heat food with heater 4 while stirring the food in container 2 by rotation of stirring body 6.

Figure 8:
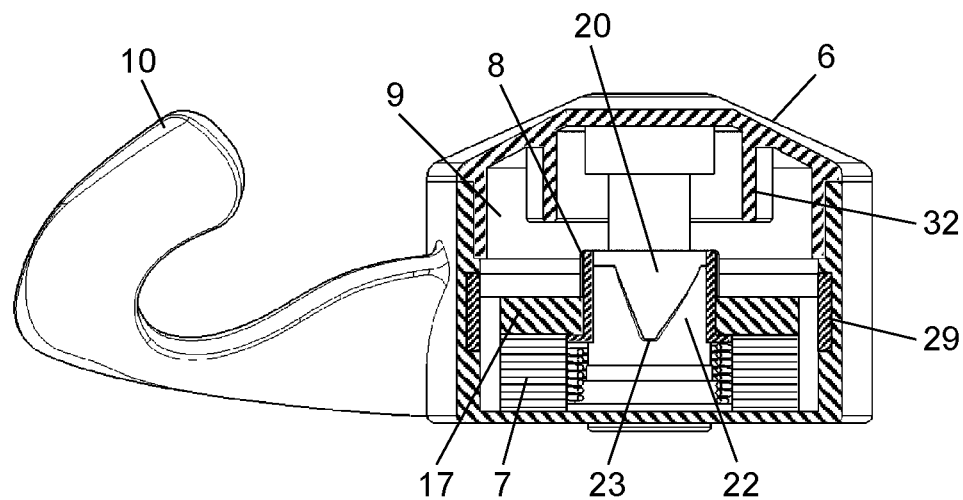
FIG. 8 is a cross-sectional view for illustrating an operation of a stirring body according to Embodiment 1.

At this time, clutch 8 is in the state of transmitting the rotational force of the rotating magnetic field to storage 9. Specifically, as shown in FIGS. 4 and 8, inside storage 9, claw 20 and notch 23 engage with each other, and permanent magnet 7 is located on the bottom surface of storage 9. At this time, as shown in FIG. 4, the gap between permanent magnet 7 and permanent magnet 12 (gap G1) is narrowest; the maximum magnetic attractive force can be generated between these magnets.

At the same time, coil spring 27 is compressed, and thus the force pushing permanent magnet 7 up increases. However, since the magnetic attractive force between permanent magnet 7 and permanent magnet 12 is far higher, said force has little impact on the rotational force that is transmitted to stirring body 6. In the present embodiment, the magnetic attractive force of approximately 4.0 Kgf is generated.

As shown in FIG. 8, claw 20 and notch 23 engage with each other in storage 9 and thus, when the rotational force of the rotating magnetic field is transmitted to permanent magnet 7, the rotational force is transmitted to clutch recess 22 via clutch projection 19. With this, storage 9 rotates around shaft 26. Blade 10 rotates together with storage 9 and stirs the food.

After cooking is completed and drive motor 14 is stopped, a user rotates stirring body 6 clockwise, as shown in FIG. 2, to take out stirring body 6 from the inside of container 2.

Permanent magnet 7 in stirring body 6 attempts to remain in the same state with the magnetic attractive force between permanent magnet 7 and permanent magnet 12. Therefore, as shown in FIG. 9, the force pushing notch 23 clockwise acts from claw 20 to push claw 20 up along inclined surface 30 of notch 23.

At this time, permanent magnet 12 does not rotate, but only permanent magnet 7 rotates, and thus a repulsive force occurs between permanent magnet 7 and permanent magnet 12. With this repulsive force added, permanent magnet 7 rises along inclined surface 30. Ultimately, the tip of claw 20 is laid on sliding surface 28 (refer to FIG. 10).

In the state shown in FIG. 10, claw 20 and notch 23 are not in engagement with each other, and thus clutch 8 is in the state of not transmitting the rotational force of the rotating magnetic field to storage 9.

In this case, as shown in FIG. 5, gap G2 between permanent magnet 7 and permanent magnet 12 is larger than gap G1 shown in FIG. 4 by the height of notch 23. In the present embodiment, the height of the engagement portion is set to approximately 10 mm. Thus, the magnetic attractive force between permanent magnet 7 and permanent magnet 12 is reduced to approximately 1.0 Kgf, which is approximately 25% of that during stirring. As a result, it is possible to easily take out stirring body 6 from the inside of container 2.

As shown in FIG. 10, in stirring body 6 that has been taken out, permanent magnet 7 is closest to upper position fixing member 32. Therefore, when stirring body 6 is placed on a magnetic metal, for example, a kitchen sink, permanent magnet 7 is separated from a metal surface by spatial distance L1 which is the sum of the thickness of the bottom of stirring body 6 and the height of the engagement portion of clutch 8.

In this state, there is almost no magnetic attractive force from the bottom surface of stirring body 6, and thus stirring body 6 is barely adhered to the metal surface. Likewise, eating utensils made of magnetic metals, such as a fork and a knife, are not adhered to stirring body 6.

Since claw 20 is laid on sliding surface 28, even when a certain degree of impact is applied to stirring body 6, the engagement portion of clutch 8 does not return to the state where the magnetic attractive force from the bottom surface of stirring body 6 is strong such as that shown in FIG. 8.

With the magnetic characteristics of permanent magnet 7 according to the present embodiment, the magnetic attractive force between the magnetic body and the metal plate is approximately 3.5 Kgf in the state where permanent magnet 7 is located on the bottom surface of storage 9. This magnetic attractive force is reduced to approximately 100 to 300 gf by the action clutch 8.

In the present embodiment, as shown in FIGS. 6A to 6C, magnetic metal plate 17 is provided on the upper surface of permanent magnet 7, that is, a surface of permanent magnet 7 on the opposite side from rotating magnetic field generation unit 11. According to the present embodiment, even in the state where permanent magnet 7 is closest to upper position fixing member 32, upward magnetic flux from permanent magnet 7 is concentrated on magnetic metal plate 17, and thus magnetic flux leakage upward of stirring body 6 is inhibited. As a result, adherence of a magnetic metal object to an upper part of stirring body 6 can be prevented.

In the present embodiment, as shown in FIG. 10, magnetic metal member 29 is provided on the inner side wall of storage 9 that faces the side surface of permanent magnet 7 in the state where permanent magnet 7 is closest to upper position fixing member 32. In other words, magnetic metal member 29 faces the side surface of permanent magnet 7 in the state where clutch 8 is in the state of not transmitting the rotational force of the rotating magnetic field to storage 9.

According to the present embodiment, lateral magnetic flux from permanent magnet 7 is concentrated on magnetic metal member 29, and thus magnetic flux leakage to the side of stirring body 6 is inhibited. As a result, adherence of a magnetic metal object to the side surface of stirring body 6 can be prevented.

In the present embodiment, magnetic metal member 29 is provided only on a part of the inner side wall of storage 9. However, magnetic metal member 29 may be provided on the entire inner side wall of storage 9 in accordance with the magnetic characteristics of permanent magnet 7. Magnetic metal member 29 may be provided on the side surface of permanent magnet 7. The side surface and the top of storage 9 made of magnetic metals may be joined to the bottom surface of storage 9 made of a non-metal or a non-magnetic metal by a means which joins different kinds of material.

In the present embodiment, since coil spring 27 is provided between clutch projection 19 and the bottom surface of storage 9, even when stirring body 6 is forcibly detached from container 2 without using the functions of clutch 8, coil spring 27 pushes permanent magnet 7 up to a position in which permanent magnet 7 is closest to upper position fixing member 32.

In the state where permanent magnet 7 is closest to upper position fixing member 32, coil spring 27 applies, to permanent magnet 7, force greater than the magnetic attractive force applied when a magnetic metal plate is adhered to the bottom surface of storage 9. With this, even when a certain degree of impact is applied to stirring body 6, the position of permanent magnet 7 inside storage 9 does not change.

Upon reattachment of stirring body 6 to the interior of container 2, the bottom surface of stirring body 6 is brought into contact with the bottom surface of container 2, and blade 10 is rotated clockwise, as shown in FIG. 2. Permanent magnet 7 rotates clockwise together with claw 20 laid on sliding surface 28. When claw 20 reaches notch 23, claw 20 slides down along inclined surface 31 (refer to FIG. 11). Permanent magnet 7 is positioned back on the bottom surface of storage 9 (refer to FIG. 8).

In the state immediately after stirring body 6 is brought into contact with container 2 (refer to FIG. 5), the magnetic attractive force between the two magnets, which have the maximum gap therebetween, is greater than the pressure of coil spring 27 applied to permanent magnet 7.

When blade 10 is rotated clockwise, permanent magnet 7 moves downward to the bottom of storage 9, resulting in the gap being reduced. The magnetic attractive force between the two magnets that increases accordingly is greater than the pressure of coil spring 27 that increases accordingly. As a result, permanent magnet 7 reliably moves down to the bottom surface of storage 9.

Clutch 8 further produces advantageous effects for the stirring operations performed by stirring body 6 during cooking Specifically, there are cases where food is trapped between blade 10 and the bottom surface of container 2 during stirring depending on food conditions (such as kind, size, shape, and quantity). Particularly, food is easily trapped between obstacle 16 and the tip of blade 10. The trapped food hinders rotation of stirring body 6.

Here, assume a virtual configuration of stirring body 6 in which permanent magnet 7 is fixed inside storage 9. In this case, when the rotation of stirring body 6 is hindered by the trapped food, permanent magnet 7 in storage 9 is stopped, whereas permanent magnet 12 in rotating magnetic field generation unit 11 rotates. Therefore, the two permanent magnets transition from the attracting state to the repelling state. Stirring body 6 is pushed upward with such repulsive force and detached from container 2. This results in a loss of the stirring function.

In the present embodiment, however, when the rotation of stirring body 6 is hindered by the trapped food, although stirring body 6 is stopped, rotational force that is directed clockwise in storage 9 acts on permanent magnet 7. With this rotational force, claw 20 rises along inclined surface 30 of notch 23 (refer to FIG. 9), and the tip of claw 20 is laid on sliding surface 28 (refer to FIG. 10). In this state, claw 20 rotates along sliding surface 28.

When claw 20 reaches notch 23 again, claw 20 slides down along inclined surface 31 (refer to FIG. 11). When the rotation of stirring body 6 is hindered, these operations are repeated, allowing permanent magnet 7 to continue to rotate idly in storage 9. Thus, clutch 8 is placed in the state of not transmitting the rotational force of the rotating magnetic field to storage 9. As a result, stirring body 6 is not detached from container 2; thus, the stirring function will not be lost.

In the present embodiment, inclined surface 30 having inclination angle θ1 of 65 to 85 degrees allows the reduction in the rotational force by clutch 8 to be reduced to less than 10%. When claw 20 engages with notch 23 again after rotating along sliding surface 28, claw 20 gradually moves downward along inclined surface 31 having inclination angle θ2 of 45 to 75 degrees. Thus, for example, generation of impulsive noise due to collision between claw 20 and notch 23 and damage to permanent magnet 7 can be prevented.

Note that in the present embodiment, heater 4 is provided as a heating means. However, another heating means that uses induction heating, steam, hot air, radiation heating, or the like may be used.

As described above, the heating/stirring cooker according to the present embodiment can stir food while heating. With this, it is possible to prevent burning of food while stewing, for example.

According to the present embodiment, it is possible to prevent displacement of stirring body 6 from a predetermined position in container 2 even when the food trapped between stirring body 6 and container 2 hinders the rotation of stirring body 6 during stirring. Adherence of a magnetic metal object to stirring body 6 can be prevented when stirring body 6 is handled outside container 2 for the purposes of washing, storage, and so on.

Embodiment 2

Figure 12:
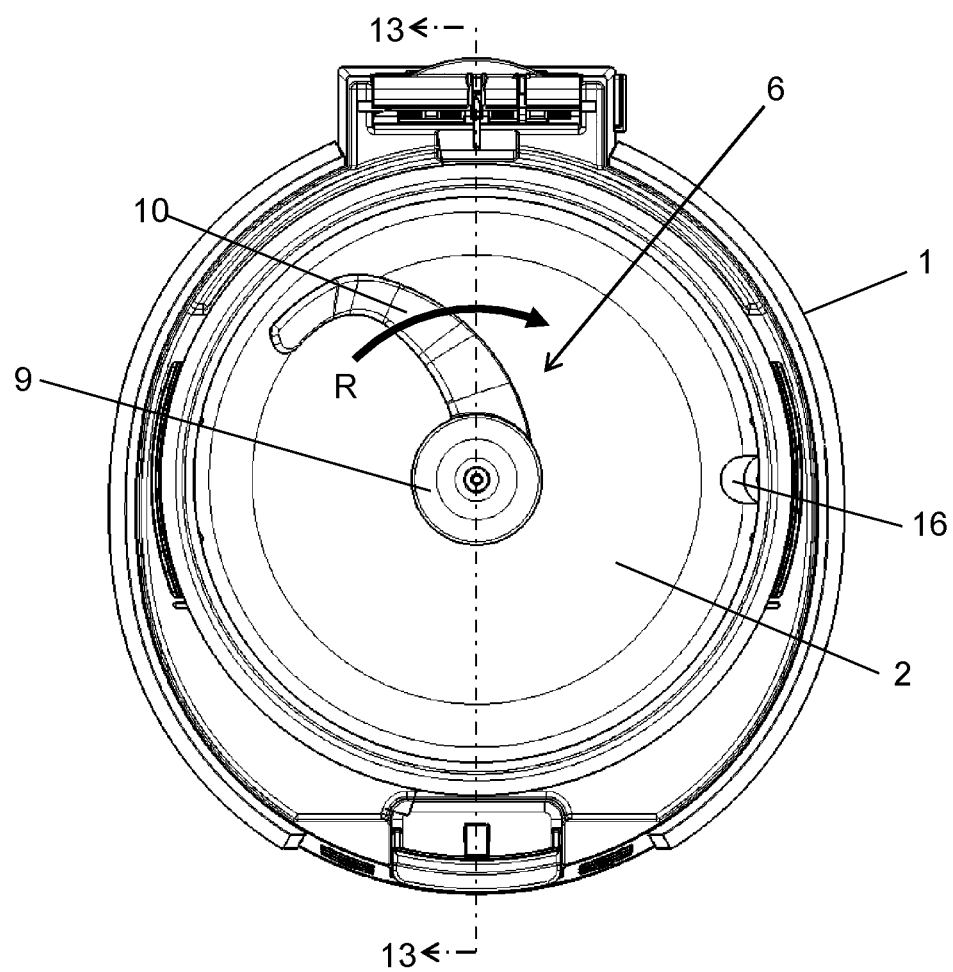
FIG. 12 is a top view of a heating/stirring cooker according to Embodiment 2 with the lid removed.
Figure 13:
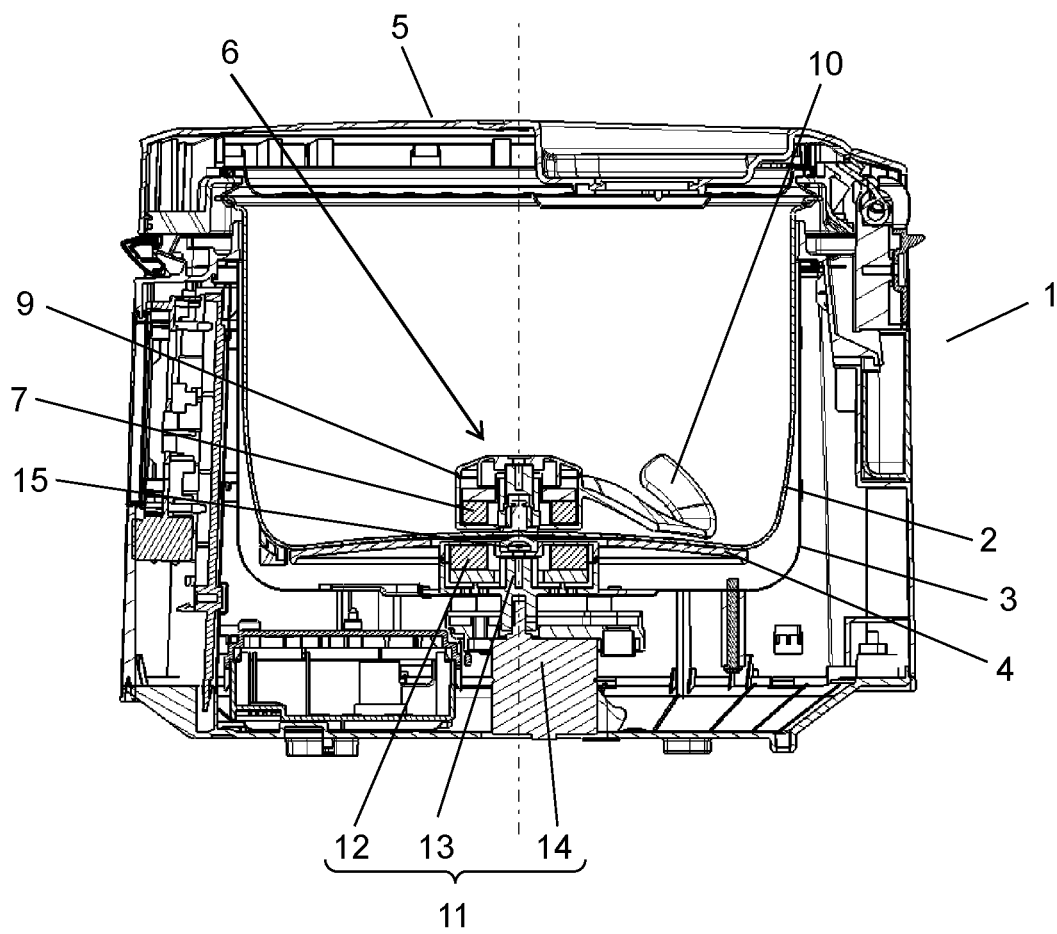
FIG. 13 is a cross-sectional view taken along line 13-13 in FIG. 12.
Figure 14A:
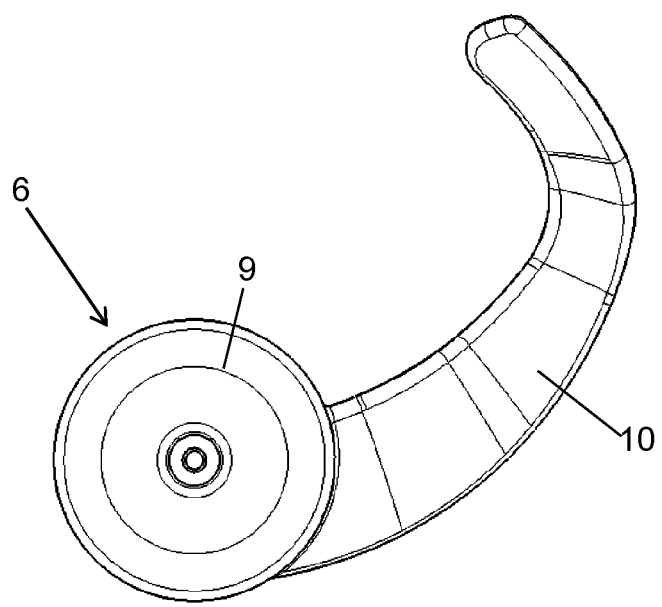
FIG. 14A is a plan view of a stirring body according to Embodiment 2.
Figure 14B:
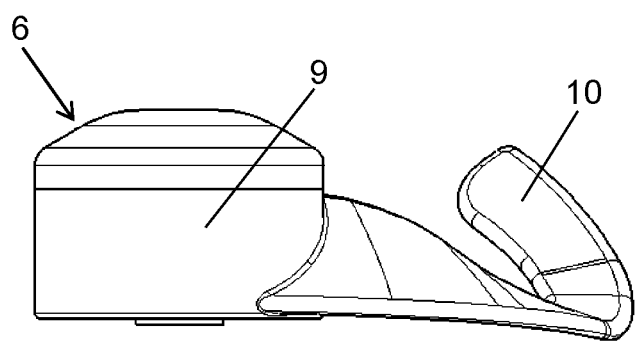
FIG. 14B is a side view of a stirring body according to Embodiment 2.

Embodiment 2 of the present disclosure will be described. FIG. 12 is a top view of a heating/stirring cooker according to Embodiment 2 of the present disclosure with the lid removed. FIG. 13 is a cross-sectional view taken along line 13-13 in FIG. 12. FIG. 14A and FIG. 14B are a plan view and a side view, respectively, of a stirring body according to the present embodiment.

As described above, permanent magnet 12 generates a rotating magnetic field by being rotated by drive motor 14. Permanent magnet 7 rotates by the effect of the magnetic field from permanent magnet 12. In other words, permanent magnet 12 functions as a driving permanent magnet, and permanent magnet 7 functions as a permanent magnet to be driven.

As in Embodiment 1, permanent magnet 12 is made of a sintered neodymium magnet which has the most powerful magnetic force among general magnets. Meanwhile, in the present embodiment, permanent magnet 7 includes at least one of a samarium-cobalt magnet, an Fe—Cr—Co magnet, an Fe—Nd—B bond magnet, and a ferrite magnet. These kinds of magnets have magnetic force less than that of permanent magnet 12.

Figure 15:
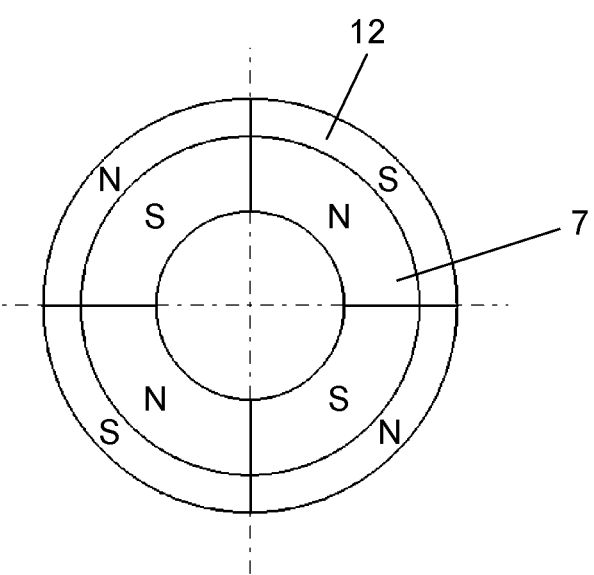
FIG. 15 schematically shows two permanent magnets in a situation where a stirring body is attached in a predetermined position.

FIG. 15 schematically shows permanent magnets 7 and 12 in a situation where stirring body 6 is attached in a predetermined position. As shown in FIG. 15, permanent magnet 7 includes two north poles and two south poles alternately arranged circumferentially, as in Embodiment 1. Likewise, permanent magnet 12 includes two north poles and two south poles alternately arranged circumferentially. The outside diameter of permanent magnet 7 is smaller than the outside diameter of permanent magnet 12.

Figure 16A:
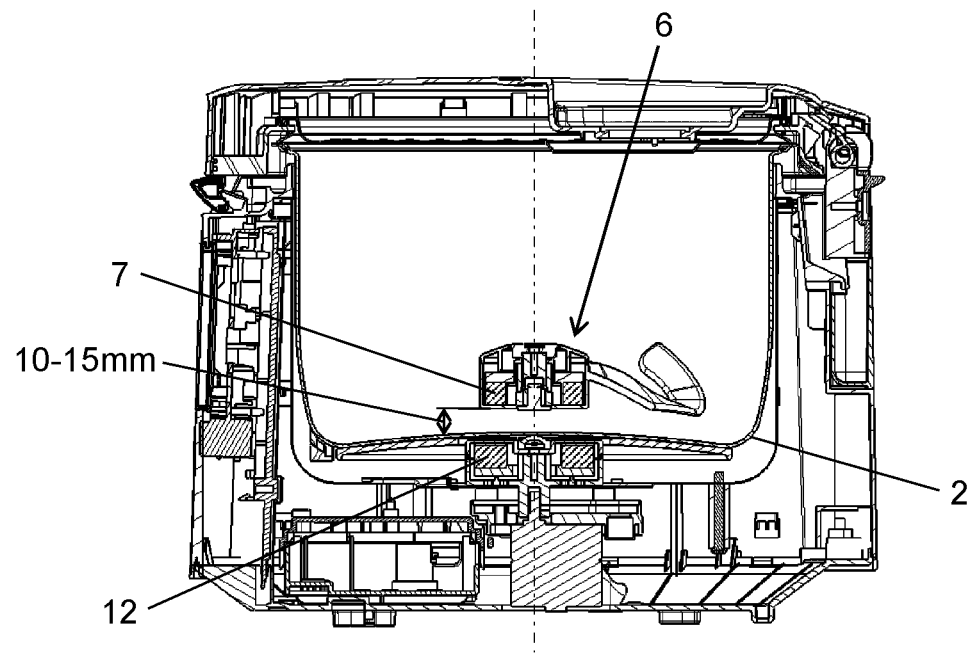
FIG. 16A illustrates attachment and detachment of a stirring body.

Here, attachment of stirring body 6 to container 2 and detachment of stirring body 6 from container 2 will be described with reference to FIGS. 16A and 16B.

When stirring body 6 is brought into contact with the center of the bottom surface of container 2 in the state where container 2 is housed in container housing 3, permanent magnet 7 and permanent magnet 12 are magnetically coupled to each other via a predetermined space. In order to attach stirring body 6 to the bottom surface of container 2, when stirring body 6 is brought close to a point approximately 10 to 15 mm above the bottom surface of container 2, attractive force starts acting on stirring body 6, and thus stirring body 6 is attracted to the bottom surface of container 2 (refer to FIG. 16A).

Figure 16B:
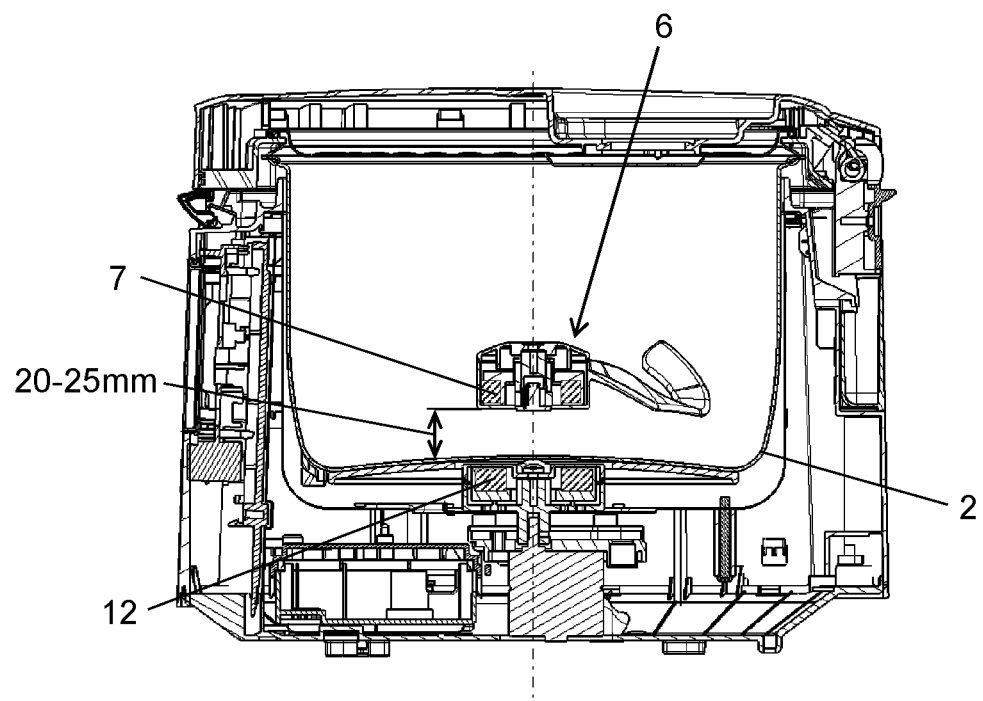
FIG. 16B illustrates attachment and detachment of a stirring body.

Assuming the case where permanent magnet 7 is made of a sintered neodymium magnet, the attractive force starts acting at a level approximately 20 to 25 mm above the bottom surface of container 2 (refer to FIG. 16B). Generally, with this distance, a user is not likely to recognize the proximity of stirring body 6 to the bottom surface of container 2, but begins to feel the attractive force earlier than expected.

In the case of detaching stirring body 6, in the present embodiment, the attractive force for stirring body 6 is reduced at a level approximately 5 mm above the bottom surface of container 2, and thus detachment thereof becomes easier. However, in the case where permanent magnet 7 is made of a sintered neodymium magnet, a user needs to lift stirring body 6 up at least approximately 10 mm above the bottom surface of container 2 in order to feel a reduction in the attractive force.

This is attributed to a difference in the magnetic characteristics, particularly, the magnetic flux density. Generally, the sintered neodymium magnet has magnetic flux density of 1.0 to 1.5 tesla (T), and the Fe—Nd—B bond magnet has magnetic flux density of 0.7 to 0.9 T, for example.

Figure 17A:
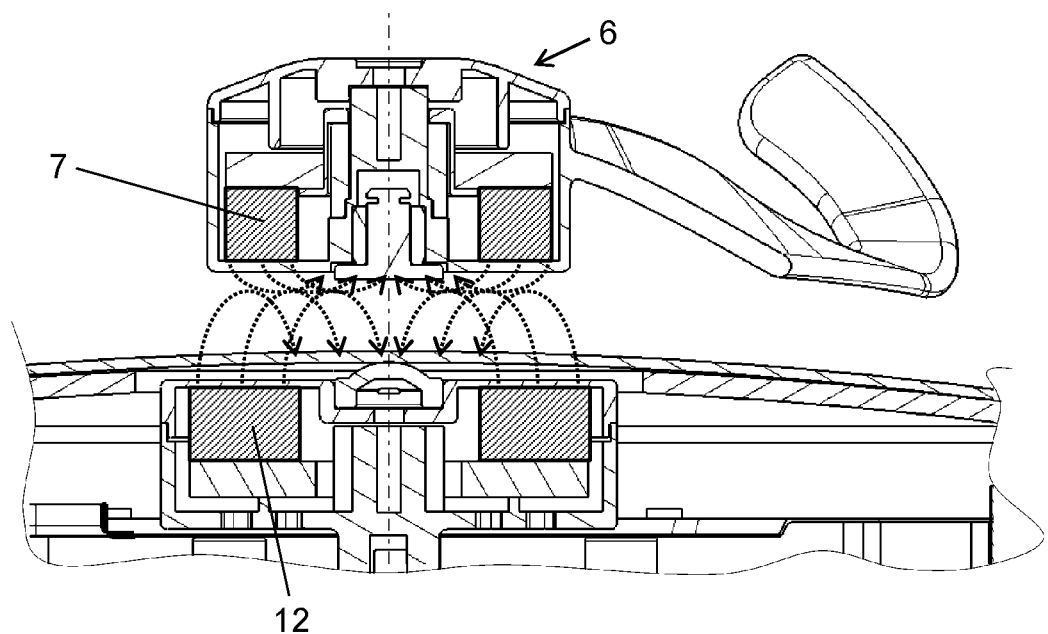
FIG. 17A schematically shows the flow of magnetic flux according to the second embodiment.
Figure 17B:
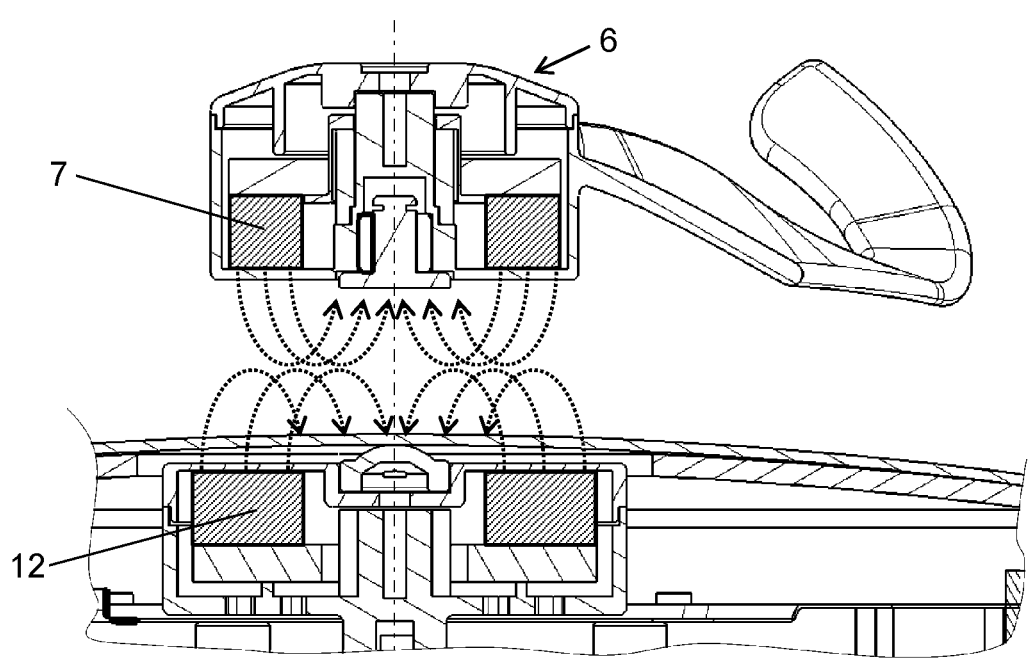
FIG. 17B schematically shows the flow of magnetic flux in a configuration for comparison with that in FIG. 17A.

FIG. 17A schematically shows the flow of magnetic flux in a configuration in which permanent magnet 7 is made of an Fe—Nd—B bond magnet, for example, in the present embodiment. FIG. 17B schematically shows the flow of magnetic flux in a configuration in which permanent magnet 7 is made of a sintered neodymium magnet for comparison with that in FIG. 17A.

As shown in FIGS. 17A and 17B, the flows of the magnetic flux from permanent magnet 12 in the two cases are the same. However, the coverage of the magnetic flux in FIG. 17A is smaller than that in FIG. 17B. Specifically, the distance between stirring body 6 and the bottom surface of container 2 at which the attractive force starts acting is less in the case in FIG. 17A than in the case in FIG. 17B. According to the present embodiment, upon attachment of stirring body 6 to container 2, stirring body 6 is easy to handle.

In the present embodiment, as shown in FIG. 15, the outside diameter of permanent magnet 12 is greater than the outside diameter of permanent magnet 7. Therefore, the magnetic flux from permanent magnet 12 expands beyond that in the case according to Embodiment 1. According to the present embodiment, high rotational force can be obtained even when permanent magnet 7 made of a magnet having magnetic force less than that of a sintered neodymium magnet is used.

Regarding the present embodiment, the inventors conducted experiments under the condition that the gap between the magnets is 8 mm. When each of permanent magnets 7 and 12 had an outside diameter of 45 mm, the rotational force (step-out torque) was approximately 0.6 Nm. When permanent magnet 7 had an outside diameter of 45 mm and permanent magnet 12 had an outside diameter of 55 mm, the rotational force (step-out torque) increased to approximately 0.9 Nm.

Figure 18:
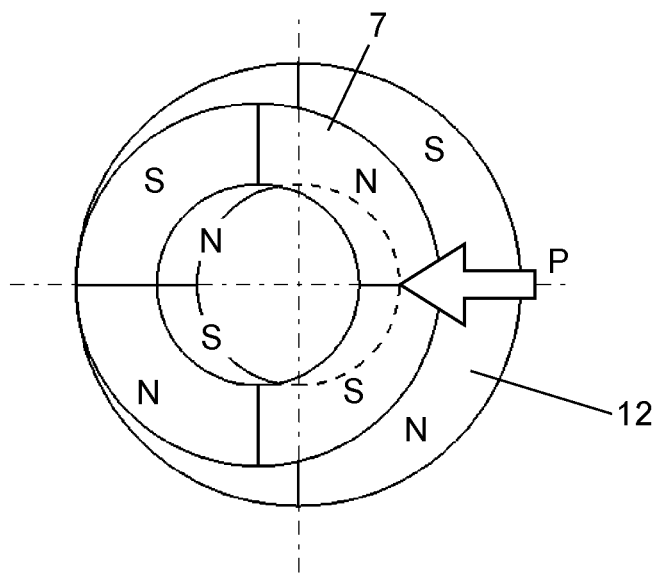
FIG. 18 schematically shows a situation where a stirring body is displaced from a predetermined position.

FIG. 18 schematically shows a situation where stirring body 6 is displaced from a predetermined position (refer to FIG. 15). As shown in FIG. 18, even when stirring body 6 moves in the direction of arrow P from the position shown in FIG. 15 due to food being trapped between obstacle 16 and blade 10, permanent magnet 7 does not easily protrude outside permanent magnet 12. As a result, the stirring function is maintained.

As described above, stirring body 6 according to the present embodiment can generate high rotational force while stirring, and is easy to handle upon attachment and detachment.

Embodiment 3

Figure 19:
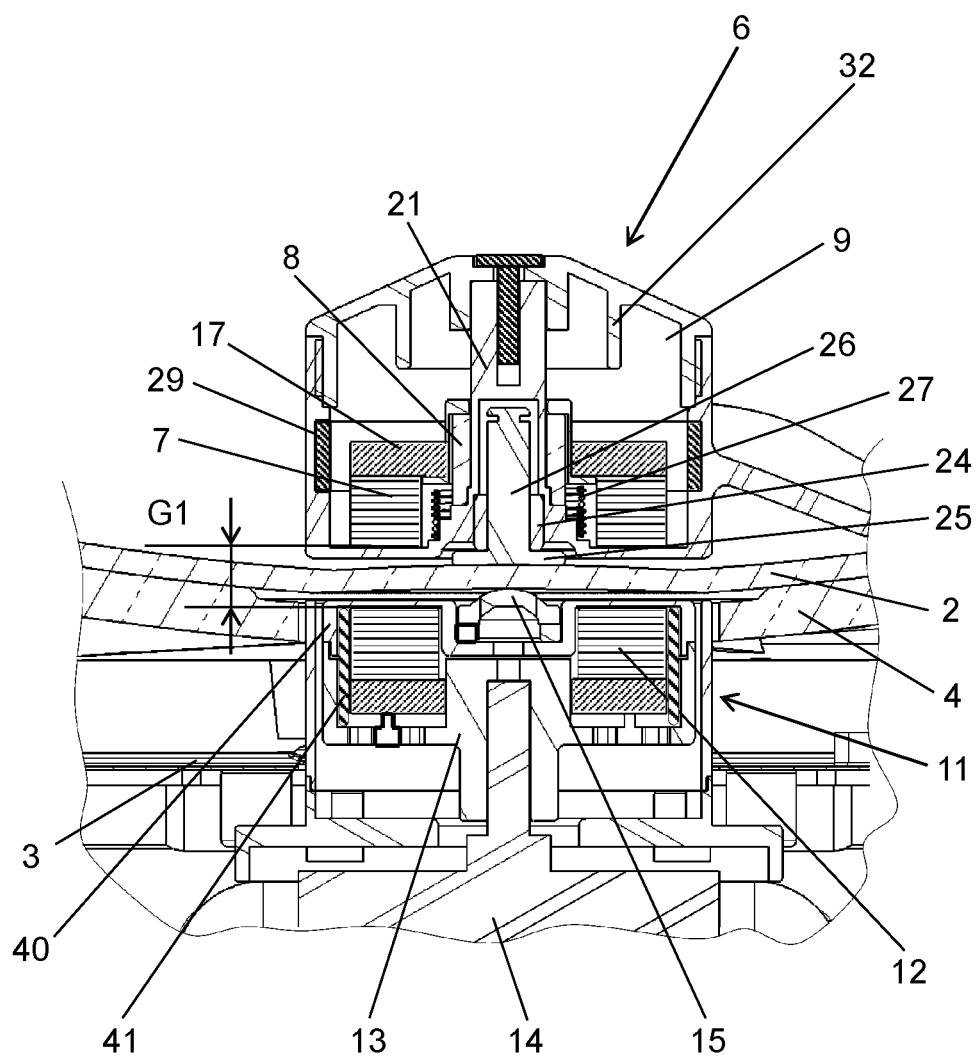
FIG. 19 is a cross-sectional view of a relevant portion of a heating/stirring cooker according to Embodiment 3.

Embodiment 3 of the present disclosure will be described. FIG. 19 is a cross-sectional view of a heating/stirring cooker according to the present embodiment. As shown in FIG. 19, in the present embodiment, separator 40 and biasing device 41 are included in addition to the elements in Embodiment 1.

Separator 40 is provided so as to cover the upper surface and the side surface of permanent magnet 12. Separator 40 is made of an aluminum alloy which is a non-magnetic metal material having high thermal conductivity that allows passage of the magnetic flux of permanent magnet 12.

Biasing device 41 is provided inward of separator 40 so as to surround the side surface of permanent magnet 12. Biasing device 41 is formed of a coil spring or the like, and biases separator 40 upward so that separator 40 is separated from permanent magnet 12.

When container 2 is housed in container housing 3, the outer bottom surface of container 2 contacts spacer 15, pushing separator 40 down. As a result, separator 40 approaches permanent magnet 12. When container 2 is taken out of container housing 3, biasing device 41 pushes separator 40 up so that separator 40 returns to the original state.

Thus, when container 2 is housed in container housing 3, the rotating magnetic field can more effectively act on stirring body 6. When container 2 is taken out of container housing 3, adherence of a magnetic metal object to the inner bottom surface of container housing 3 can be prevented.

In the present embodiment, spacer 15 is made of a ceramic material that is separate from separator 40 from the perspectives of the coefficient of friction and the wear resistance. Spacer 15 may be provided integrally with separator 40 if an engineering plastic or the like with heat resistance and a low coefficient of friction is used.

Figure 20A:
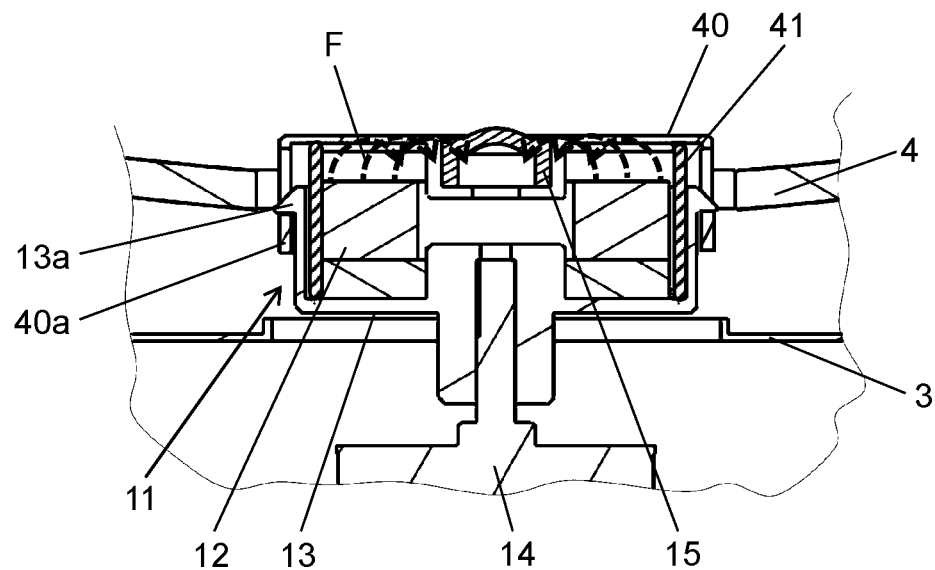
FIG. 20A is a cross-sectional view of a relevant portion for illustrating a separator according to Embodiment 3.
Figure 20B:
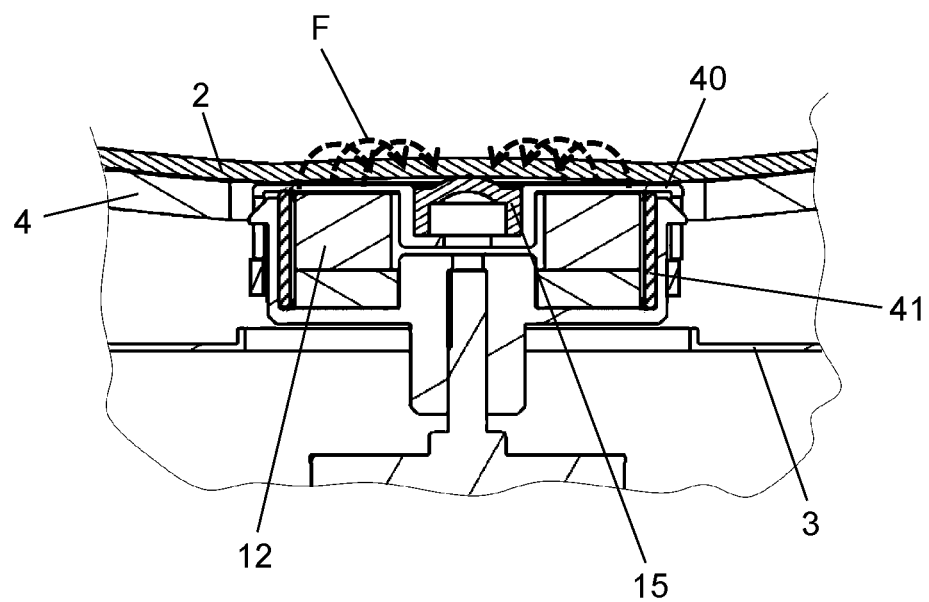
FIG. 20B is a cross-sectional view of a relevant portion for illustrating a separator according to Embodiment 3.

FIGS. 20A and 20B are cross-sectional views of a relevant portion for illustrating separator 40 according to the present embodiment. FIG. 20A shows the state where container 2 is not housed in container housing 3, and FIG. 20B shows the state where container 2 is housed in container housing 3.

As shown in FIG. 20A, when hook 13a of coupling portion 13 locks with hole 40a of separator 40, separator 40 protrudes upward from heater 4. In this state, magnetic field F from permanent magnet 12 is separated by separator 40. In other words, with separator 40, a magnetic metal object or the like is distanced from the magnetic field from permanent magnet 12. Thus, adherence of a magnetic metal object to permanent magnet 12 can be prevented.

As shown in FIG. 20B, when separator 40 is pushed down by container 2, separator 40 approaches permanent magnet 12. In this state, attachment of stirring body 6 to container 2 results in interlinkage between the magnetic field from permanent magnet 12 and the magnetic field from permanent magnet 7, allowing stirring body 6 to be driven in the rotating magnetic field generated by rotating magnetic field generation unit 11.

The biasing force of biasing device 41 is set so that the weight of container 2 allows the outer bottom surface of container 2 to contact heater 4 against the biasing force of biasing device 41. The biasing force of biasing device 41 may be set in consideration of the weight of container 2 that includes the weight of food and the pressure applied by lid 5 to container 2.

As described above, according to the present embodiment, it is possible to provide a stirring body which when attached, can generate high rotational force and when detached, can suppress the impact of a magnetic field, and a heating/stirring cooker including the stirring body.

In the present embodiment, a gap is provided between separator 40 and biasing device 41 so that they do not contact coupling portion 13. This gap prevents the occurrence of the sliding resistance due to contact.

Figure 21A:
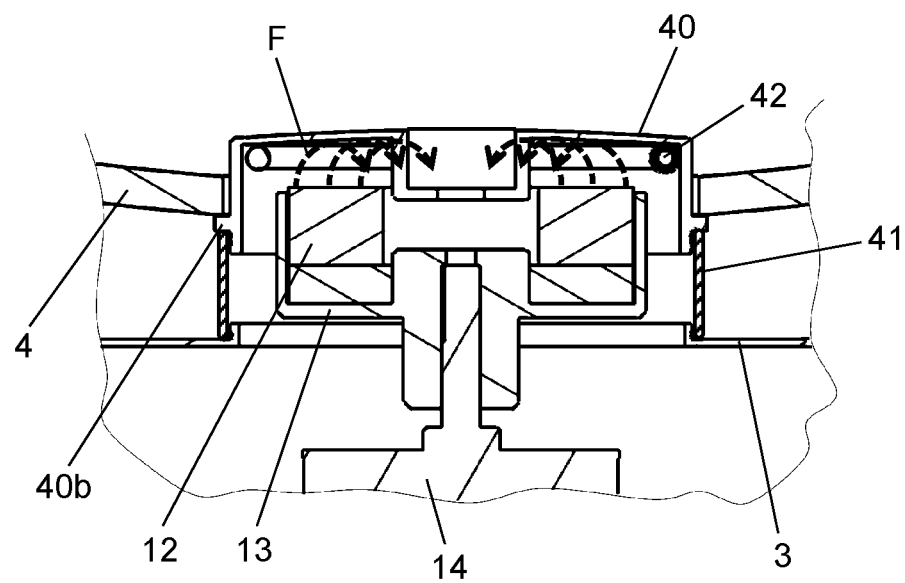
FIG. 21A is a cross-sectional view of a relevant portion for illustrating a separator according to a variation of Embodiment 3.
Figure 21B:
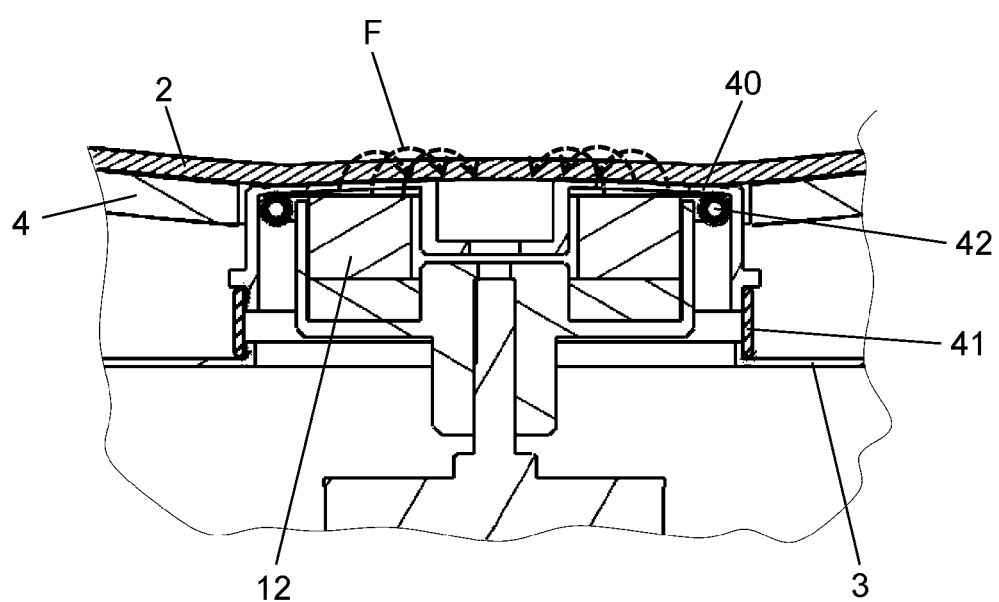
FIG. 21B is a cross-sectional view of a relevant portion for illustrating a separator according to a variation of Embodiment 3.

FIGS. 21A and 21B are cross-sectional views of a relevant portion for illustrating separator 40 according to a variation of the present embodiment. FIG. 21A shows the state where container 2 is not housed in container housing 3, and FIG. 21B shows the state where container 2 is housed in container housing 3.

In the present variation, temperature sensor 42 which detects the temperature of container 2 is provided in separator 40. Since separator 40 is made of an aluminum alloy which is a non-magnetic metal material having high thermal conductivity, accurate temperature detection by temperature sensor 42 is possible.

As shown in FIG. 21A, when protrusion 40b of separator 40 locks with heater 4, separator 40 protrudes upward from heater 4. In this state, magnetic field F from permanent magnet 12 is separated by separator 40. In other words, with separator 40, a magnetic metal object or the like is distanced from the magnetic field from permanent magnet 12. Thus, adherence of a magnetic metal object to permanent magnet 12 can be prevented.

As shown in FIG. 21B, when separator 40 is pushed down by container 2, separator 40 approaches permanent magnet 12. In this state, attachment of stirring body 6 to container 2 results in interlinkage between the magnetic field from permanent magnet 12 and the magnetic field from permanent magnet 7, allowing stirring body 6 to be driven in the rotating magnetic field generated by rotating magnetic field generation unit 11.

Temperature sensor 42 is provided at the backside of separator 40 opposite the top surface, and detects the temperature of the area around the center of the outer bottom surface of container 2. The top surface of the separator 40 has a shape corresponding to the outer bottom surface of container 2 so that temperature sensor 42 accurately detects a temperature.

Embodiment 4

Figure 22:
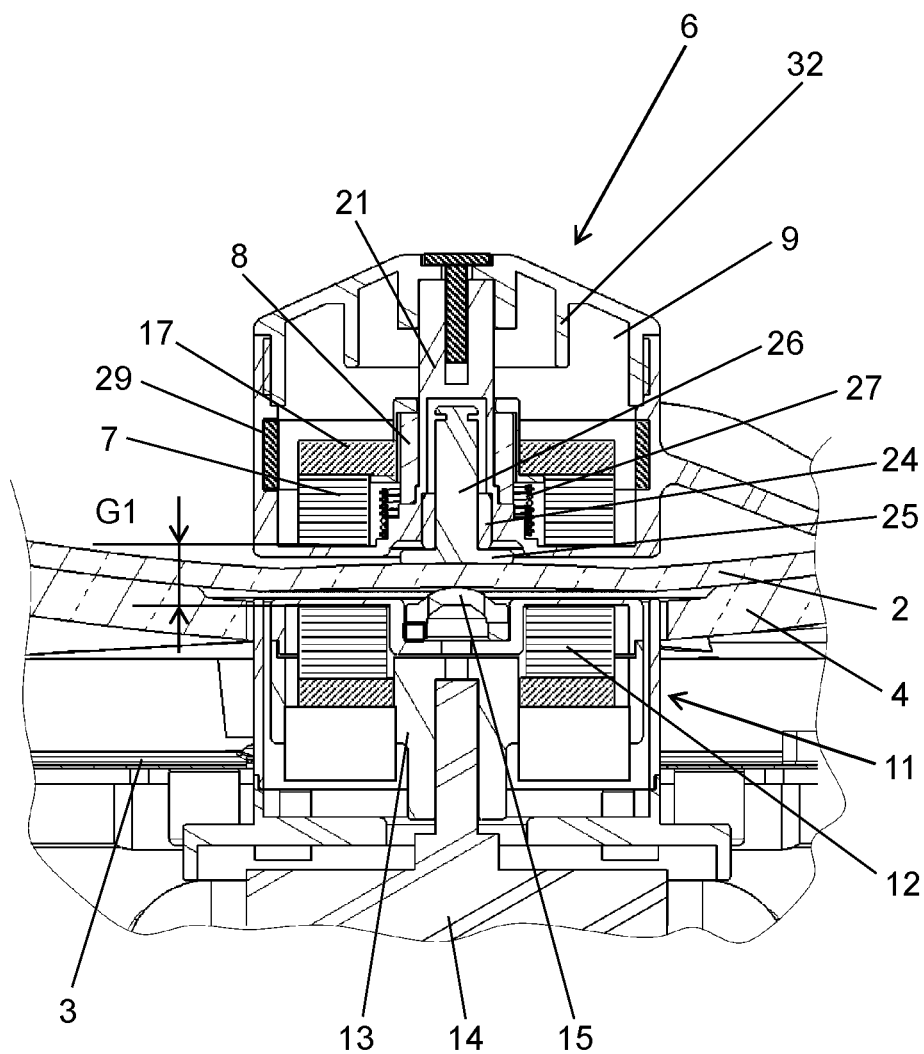
FIG. 22 is a cross-sectional view of a relevant portion of a heating/stirring cooker according to Embodiment 4.
Figure 23:
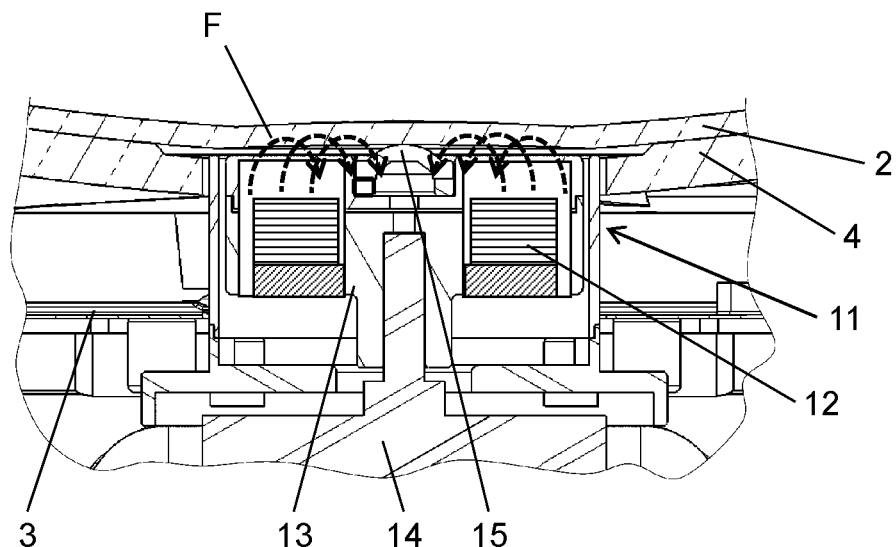
FIG. 23 is a cross-sectional view of a relevant portion of a heating/stirring cooker according to Embodiment 4.
Figure 24:
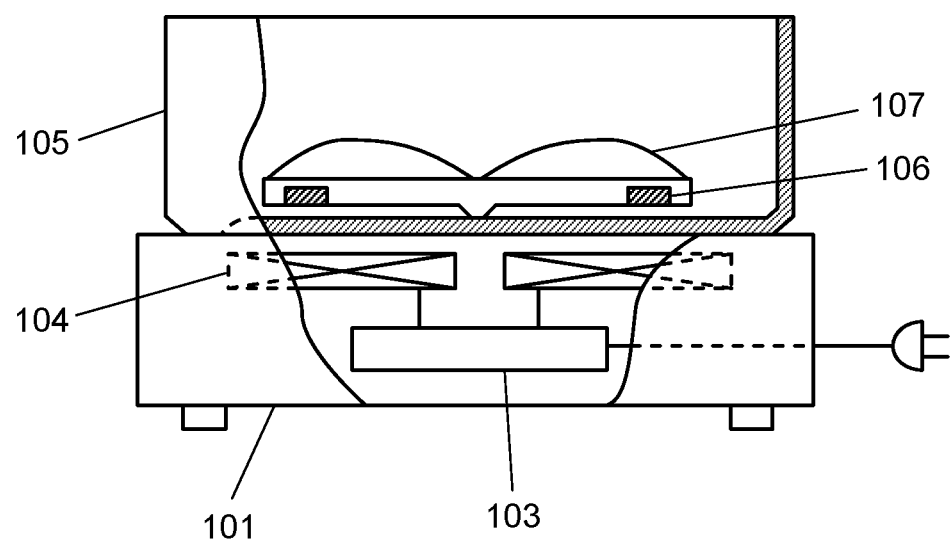
FIG. 24 is a block diagram of a conventional heating cooker.

Embodiment 4 of the present disclosure will be described. FIG. 22 is a cross-sectional view of a relevant portion of a heating/stirring cooker according to the present embodiment. FIG. 23 schematically shows the magnetic field from permanent magnet 12 in the case where stirring body 6 is not attached to container 2. In the present embodiment, coupling portion 13 stores permanent magnet 12 in such a way that permanent magnet 12 is vertically movable.

When stirring body 6 is attached to container 2, the magnetic field from permanent magnet 7 acts on permanent magnet 12. By the effect of the magnetic field from permanent magnet 7, permanent magnet 12 moves to the uppermost section in coupling portion 13 so as to approach stirring body 6. At this time, permanent magnet 12 fits into coupling portion 13. When drive motor 14 rotates, permanent magnet 12 rotates integrally with coupling portion 13.

As shown in FIG. 23, when stirring body 6 is detached from container 2, the magnetic field from permanent magnet 7 no longer acts on permanent magnet 12. Therefore, permanent magnet 12 moves to the lowermost section in coupling portion 13 by the effect of its own weight. As a result, the fitting between permanent magnet 12 and coupling portion 13 is undone.

When permanent magnet 12 moves to the lowermost section in coupling portion 13, magnetic field F leaking upward can be reduced. Thus, when stirring body 6 is not attached to container 2, adherence of a magnetic metal object to the inner bottom surface of container 2 can be prevented.

INDUSTRIAL APPLICABILITY

The stirring body and the heating/stirring cooker according to the present disclosure are applicable to a cooker and a processing device which cut, crush, and knead food aside from stirring food.

REFERENCE MARKS IN THE DRAWINGS 1 heating/stirring cooker
2 container
3 container housing
4 heater
5 lid
6 stirring body
7, 12, 106 permanent magnet
8 clutch
9 storage
10 blade
11 rotating magnetic field generation unit
13 coupling portion
13a hook
14 drive motor
15 spacer
16 obstacle
17 magnetic metal plate
18 opening
19 clutch projection
20 claw
21 column
22 clutch recess
23 notch
24 bush
25 receiving portion
26 shaft
27 coil spring
28 sliding surface
29 magnetic metal member
30, 31 inclined surface
32 upper position fixing member
40 separator
40a locking hole
40b protrusion
41 biasing device
42 temperature sensor
50 control unit
101 main body 103 inverter
104 coil
105 pot
107 rotary vane

The invention claimed is:

1. A stirring body which is detachably attached to an interior of a container in which food is placed, and is configured to stir the food in the container, the stirring body comprising:
a blade configured to stir the food;
a permanent magnet which is located opposite an inner bottom surface of the container and configured to receive a rotating magnetic field when the stirring body is attached to the container;
a magnetic metal plate which is provided on the permanent magnet and configured to inhibit magnetic flux leakage;
a storage configured to movably store the permanent magnet, the storage having a perimeter on which the blade is formed; and
a clutch configured to hold either a state where a rotational force of the rotating magnetic field is transmitted to the storage or a state where the rotational force of the rotating magnetic field is not transmitted to the storage.

2. The stirring body according to claim 1, wherein the clutch includes: a claw provided integrally with the permanent magnet; and a notch which is provided on the storage and engageable with the claw, the clutch is configured to transmit the rotational force of the rotating magnetic field to the storage when the claw is in engagement with the notch, and the clutch is configured not to transmit the rotational force of the rotating magnetic field to the storage when the claw is not in engagement with the notch.

3. The stirring body according to claim 2, wherein the clutch has a sliding surface continuously formed from the notch, and the claw is configured to rotate along the sliding surface to inhibit the rotational force of the rotating magnetic field from being transmitted to the storage.

4. The stirring body according to claim 1, wherein the storage includes a coil spring which presses against the permanent magnet in a direction opposite to a direction in which the rotating magnetic field attracts the permanent magnet.

5. The stirring body according to claim 1, wherein a magnetic metal member is provided on an inner side wall of the storage that faces a side surface of the permanent magnet when the clutch does not transmit the rotational force of the rotating magnetic field to the storage.

6. A heating/stirring cooker comprising:
a stirring body which is detachably attached to an interior of a container in which food is placed, and is configured to stir the food in the container, the stirring body including
a blade configured to stir the food,
a permanent magnet to be driven which is located opposite an inner bottom surface of the container and configured to receive a rotating magnetic field when the stirring body is attached to the container,
a magnetic metal plate which is provided on the permanent magnet and configured to inhibit magnetic flux leakage,
a storage configured to movably store the permanent magnet, the storage having a perimeter on which the blade is formed, and
a clutch configured to hold either a state where a rotational force of the rotating magnetic field is transmitted to the storage or a state where the rotational force of the rotating magnetic field is not transmitted to the storage;
the container in which the food is placed;
a rotating magnetic field generation unit which includes a driving permanent magnet and generates the rotating magnetic field;
a container housing which includes the rotating magnetic field generation unit and houses the container; and
a heater provided in the container housing and configured to heat the container.

7. The heating/stirring cooker according to claim 6, wherein
the driving permanent magnet has more powerful magnetic force than the permanent magnet to be driven.

8. The heating/stirring cooker according to claim 7, wherein
the driving permanent magnet includes a sintered neodymium magnet, and the permanent magnet to be driven includes at least one of a samarium-cobalt magnet, an Fe—Cr—Co magnet, an Fe—Nd—B bond magnet, and a ferrite magnet.

9. The heating/stirring cooker according to claim 6, further comprising:
a separator provided covering the rotating magnetic field generation unit; and a biasing device which biases the separator away from the rotating magnetic field generation unit, wherein the separator is configured to, when the container is housed in the container housing, be pushed by the container and approach the rotating magnetic field generation unit, and when the container is detached from the container housing, return to an original state by a biasing force of the biasing device.

10. The heating/stirring cooker according to claim 9, wherein
the separator includes a non-magnetic metal material.

11. The heating/stirring cooker according to claim 6, wherein
the driving permanent magnet is configured to, by an effect of a magnetic field from the permanent magnet to be driven, approach the stirring body when the stirring body is attached to the container, and be separated from the stirring body when the stirring body is detached from the container.

12. The heating/stirring cooker according to claim 11, wherein
the rotating magnetic field generation unit includes: a coupling portion which movably stores the driving permanent magnet; and a drive motor coupled to the coupling portion, and the driving permanent magnet is configured to fit into the coupling portion when the driving permanent magnet approaches the stirring body.

13. The heating/stirring cooker according to claim 6, wherein
the driving permanent magnet has an outside diameter greater than an outside diameter of the permanent magnet to be driven.

14. The heating/stirring cooker according to claim 6, wherein
the separator includes a temperature sensor which detects a temperature of the container.

* * * * *